(12) United States Patent
Kurosu et al.

(10) Patent No.: US 9,059,554 B2
(45) Date of Patent: Jun. 16, 2015

(54) DISCHARGE-PUMPED GAS LASER DEVICE

(71) Applicant: Gigaphoton Inc., Tochigi (JP)

(72) Inventors: Akihiko Kurosu, Tochigi (JP); Junichi Fujimoto, Tochigi (JP); Yosuke Ishizuka, Tochigi (JP); Takashi Matsunaga, Tochigi (JP); Osamu Wakabayashi, Tochigi (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 14/049,383

(22) Filed: Oct. 9, 2013

(65) Prior Publication Data
US 2014/0105238 A1 Apr. 17, 2014

(30) Foreign Application Priority Data

Oct. 15, 2012 (JP) .................. 2012-227584

(51) Int. Cl.
| | |
|---|---|
| H01S 3/22 | (2006.01) |
| H01S 3/036 | (2006.01) |
| H01S 3/041 | (2006.01) |
| H01S 3/225 | (2006.01) |
| H01S 3/223 | (2006.01) |
| H01S 3/02 | (2006.01) |

(52) U.S. Cl.
CPC ............... *H01S 3/036* (2013.01); *H01S 3/041* (2013.01); *H01S 3/2258* (2013.01); *H01S 3/2232* (2013.01); *H01S 3/02* (2013.01)

(58) Field of Classification Search
CPC ........................................................ H01S 3/03
USPC .................................................. 372/55, 58, 61
See application file for complete search history.

(56) References Cited

U.S. PATENT DOCUMENTS

| | | | |
|---|---|---|---|
| 5,848,089 A | 12/1998 | Sarkar et al. | |
| 6,104,735 A * | 8/2000 | Webb | 372/37 |
| 6,222,290 B1 * | 4/2001 | Schob et al. | 310/68 B |
| 6,370,174 B1 * | 4/2002 | Onkels et al. | 372/38.04 |
| 6,490,304 B1 * | 12/2002 | Yada | 372/57 |
| 6,532,246 B1 * | 3/2003 | Fukuyama et al. | 372/57 |
| 6,539,043 B1 * | 3/2003 | Shinozaki et al. | 372/59 |
| 6,603,787 B1 * | 8/2003 | Sekiguchi et al. | 372/57 |
| 2001/0050940 A1 * | 12/2001 | Ooyama et al. | 372/61 |
| 2004/0070358 A1 * | 4/2004 | Yamada | 318/560 |
| 2008/0054741 A1 | 3/2008 | Oyama | |

FOREIGN PATENT DOCUMENTS

| | | |
|---|---|---|
| JP | 11-087810 | 3/1999 |
| JP | 2008-082546 | 4/2008 |

* cited by examiner

*Primary Examiner* — Xinning Niu
*Assistant Examiner* — Vu A Vu
(74) *Attorney, Agent, or Firm* — Kratz, Quintos & Hanson, LLP

(57) ABSTRACT

A discharge-pumped gas laser device may include a laser chamber, a pair of discharge electrodes provided in the laser chamber, a fan with a magnetic bearing being provided in the laser chamber and configured to be capable of circulating a gas in the laser chamber, a housing configured to contain the laser chamber, and a magnetic bearing controller connected to the magnetic bearing electrically, being capable of controlling the magnetic bearing, and provided in the housing separately from the laser chamber.

3 Claims, 34 Drawing Sheets

RELATED ART

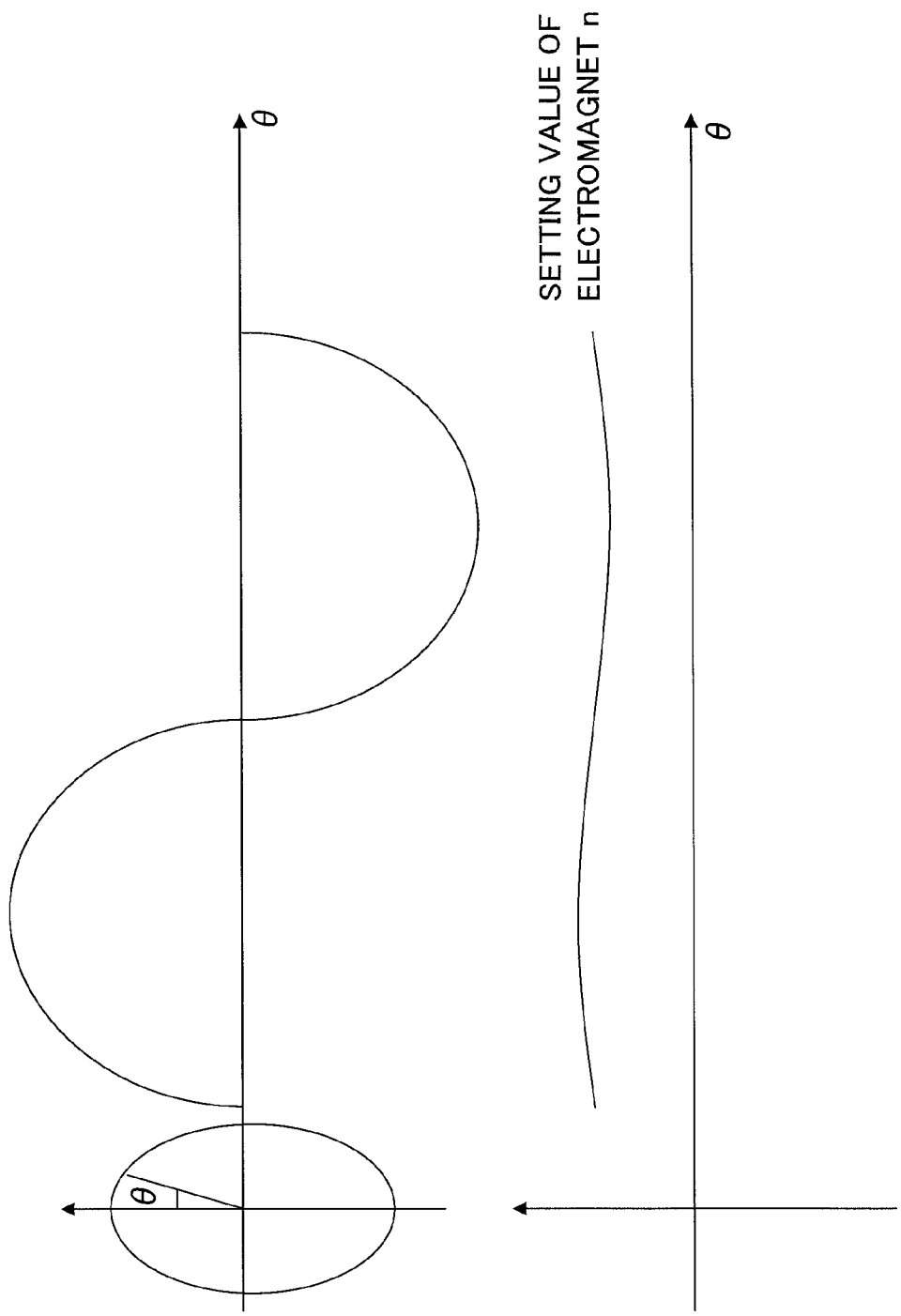

DISCHARGE-PUMPED GAS LASER DEVICE

CROSS-REFERENCE TO (A) RELATED APPLICATION(S)

The present application claims priority from Japanese Patent Application No. 2012-227584 filed Oct. 15, 2012, the entire contents of which are hereby incorporated by reference.

BACKGROUND

1. Technical Field

The present disclosure relates to a discharge-pumped gas laser device.

2. Related Art

The miniaturization and increased levels of integration of semiconductor integrated circuits have led to a demand for increases in the resolutions of semiconductor exposure devices (called "exposure devices" hereinafter). Accordingly, advances are being made in the reduction of the wavelengths of light emitted from exposure light sources. Gas laser devices are being used as exposure light sources instead of conventional mercury lamps. At present, a KrF excimer laser device that emits ultraviolet light at a wavelength of 248 nm and an ArF excimer laser device that emits ultraviolet light at a wavelength of 193 nm are being used as gas laser devices for exposure.

Immersion exposure, in which the apparent wavelength of an exposure light source is reduced by filling the space between the exposure lens of an exposure device and a wafer with a liquid and changing the refractive index, is being researched as a next-generation exposure technique. In the case where immersion exposure is carried out using an ArF excimer laser device as the exposure light source, the wafer is irradiated with ultraviolet light at a wavelength of 134 nm within the liquid. This technique is referred to as ArF immersion exposure (or ArF immersion lithography).

The natural oscillation spectral bandwidth of a KrF or ArF excimer laser device is as wide as 350-400 pm, and thus chromatic aberration will occur if the projection lens in the device is used, leading to a drop in the resolution. It is therefore necessary to narrow the spectral bandwidth (spectral width) of the laser beam emitted from the gas laser device until the chromatic aberration reaches a level that can be ignored. Accordingly, the spectral width has been narrowed by providing a line narrow module (LNM) having a line narrowing element (an etalon, a grating, or the like) within the laser resonator of the gas laser device. A laser device that narrows the spectral width in this manner is called a narrow-band laser device.

SUMMARY

A discharge-pumped gas laser device according an embodiment of the present disclosure may include a laser chamber, a pair of discharge electrodes, a fan with a magnetic bearing, a housing, and a magnetic bearing controller. The pair of discharge electrodes may be provided in the laser chamber. The fan with a magnetic bearing may be provided in the laser chamber and configured to be capable of circulating a gas in the laser chamber. The housing may be configured to contain the laser chamber. The magnetic bearing controller may be connected to the magnetic bearing electrically, be capable of controlling the magnetic bearing, and be provided in the housing separately from the laser chamber.

BRIEF DESCRIPTION OF THE DRAWINGS

Hereinafter, selected embodiments of the present disclosure will be described with reference to the accompanying drawings.

FIG. 28A is a diagram illustrating a rotational position (phase) of the rotor. FIG. 28B is a diagram illustrating a setting value of the electromagnet n and a displacement from a geometrical center.

FIG. 29A and FIG. 29B are diagrams illustrating one example of a method for calculating a center of inertia in an excimer laser device according to the present embodiment. FIG. 29A is a diagram illustrating a rotational position (phase) of a rotor. FIG. 29B is a diagram illustrating one example of a calculated value of an electromagnet n at each phase illustrated in FIG. 29A.

DETAILED DESCRIPTION

Figure 1:
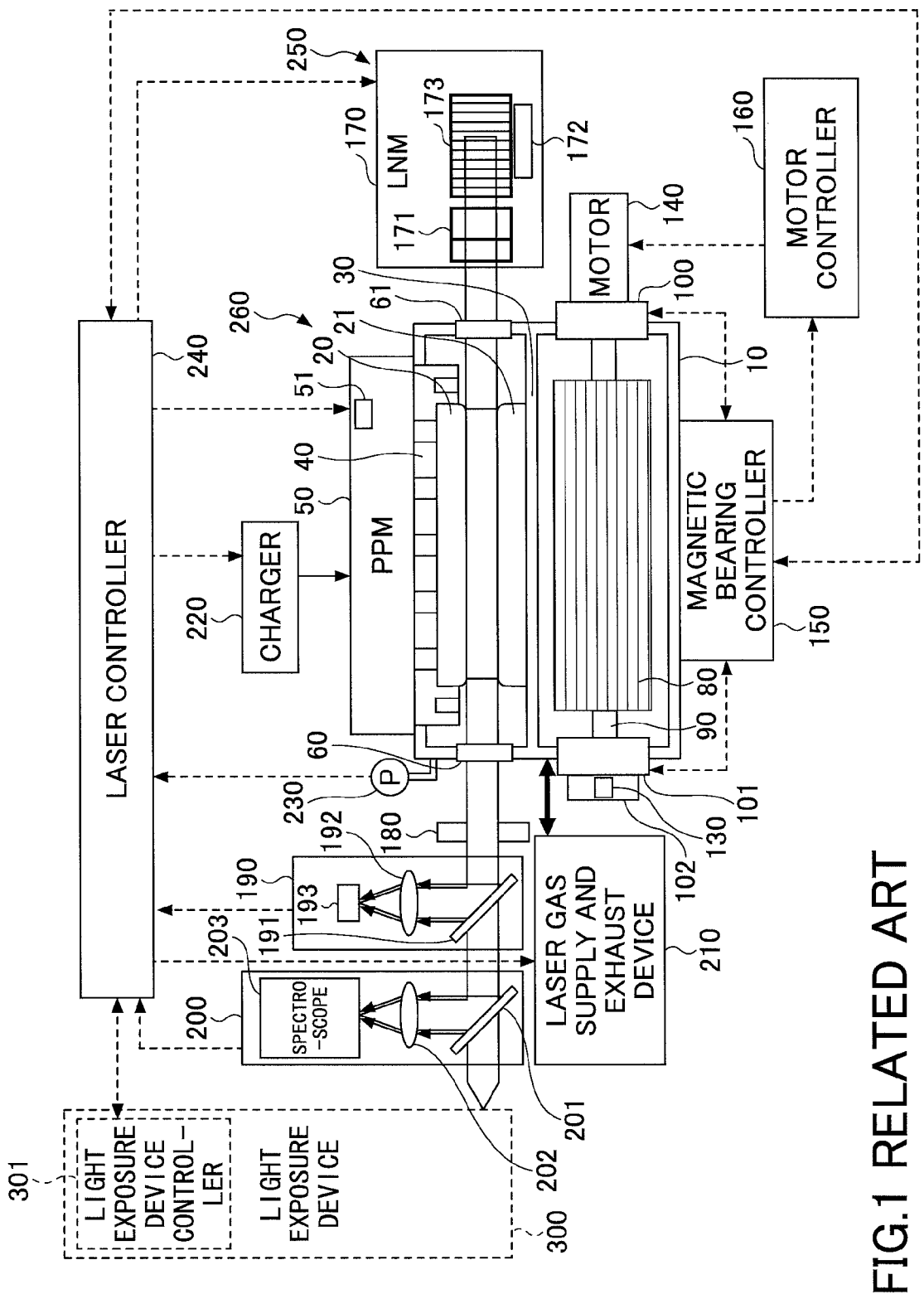
FIG. 1 is a diagram illustrating one example of a general excimer laser device used conventionally.

Hereinafter, embodiments of the present disclosure will be described in line with the following contents.
Contents
1. Overview
2. Terms
3. Excimer laser device
3.1 Configuration
3.2 Operation
3.3 Problem
4. Excimer laser device including magnetic bearings
4.1 Control flow of a laser controller
4.1.1 Flow at the time of replacement of a laser chamber
4.1.2 Flow for a certain number of shot or a certain period of time
4.1.3 Flow at the time of changing of a laser gas pressure
4.1.4 Flow based on detection of a vibration sensor
4.1.5 Flow based on a value of energy stability
4.1.6 Flow based on a value of wavelength stability
4.1.7 Flow at the time of an error output from a magnetic bearing controller
4.1.8 Flow at the time of touchdown
4.2 Acquisition and setting of control parameters for magnetic bearings
5. Control system for magnetic bearings
6. Calibration of magnetic bearings and acquisition and setting of control parameters
6.1 Calibration of a magnetic bearing sensor
6.2 Calibration of a magnetic bearing actuator
6.3 Acquisition and setting of control parameters for magnetic bearings
6.3.1 Acquisition and setting of control gains for magnetic bearings
6.3.2 Acquisition and setting of a center-of-inertia control parameter
7. Others
7.1 Calibration of a sensor and calibration of an actuator in an axial direction thereof.

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

1. Overview

A magnetic bearing controller configured to control magnetic bearings used for a fan provided in a laser chamber is arranged outside the laser chamber so that replacement of only the laser chamber is possible. Adjustment of a magnetic bearing sensor or a gain is conducted at the time of replacement of a laser chamber.

2. Terms

Terms used in the present disclosure are defined as follows.

A "discharge-pumped gas laser device" is a laser device configured to cause discharge in a laser chamber to provide a laser gas enclosed in the laser chamber with excitation energy and generate laser light. For example, an excimer laser device, a $CO_2$ laser device, an $F_2$ laser device, and the like are included therein.

A "radial direction" means a direction of a diameter of a rotator.

An "axial direction" means a direction of an axis of a rotator, and may be referred to as a "thrust direction".

A "magnetic bearing" means a rotator driving mechanism configured to include an actuator configured to float a rotor magnetically at a stator side, and include a motor configured to rotate the rotor.

3. Excimer Laser Device 3.1 Configuration

FIG. 1 is a diagram illustrating one example of a general excimer laser device used conventionally. Additionally, an excimer laser device is also one kind of discharge-pumped gas laser device. An excimer laser device may be used as a light source for a light exposure device 300 and may output generated laser light to the light exposure device 300. Additionally, the light exposure device 300 may be configured to include a light exposure device controller 301, conduct intercommunication with a laser controller 240 of the excimer laser device, and execute an instruction for an output of laser light from the excimer laser device.

The excimer laser device may include the laser controller 240, a laser oscillator system 260, and a laser gas supply and exhaust device 210.

Furthermore, the laser oscillator system 260 may include a laser chamber 10, a laser oscillator 250, an energy detector 190, a charger 220, a pulse power module (PPM) 50, and a spectrum detector 200.

Moreover, the laser chamber 10 may include a pair of discharge electrodes 20 and 21 and two windows 60 and 61 configured to transmit light from the laser oscillator 250. The laser chamber 10 may be arranged on an optical path of the laser oscillator 250.

The laser chamber 10 may further include a cross flow fan 80, a shaft 90, magnetic bearings 100 and 101, a rotational frequency sensor 130, a motor 140, a magnetic bearing controller 150, a motor controller 160, and an electrical insulator 40. One radial magnetic bearing may be installed for each of the magnetic bearings 100 and 101, and further, an axial magnetic bearing and the rotational frequency sensor 130 may be installed for a magnetic bearing 102. The rotational frequency sensor 130 may include two rotational displacement sensors as will be described below.

The laser oscillator 250 may include an output coupling mirror (output coupler (OC)) 180 and a line narrowing module (LNM) 170. The line narrowing module 170 may include a beam expanding prism 171, a rotating stage 172, and a grating 173. The grating 173 may be provided as Littrow mounting in such a manner that an angle of incidence and an angle of diffraction are identical. The grating 173 may be mounted on the rotating stage 172 to change an angle of incidence of laser light on the grating 173. Herein, the output coupling mirror (OC) 180 may be a partial reflection mirror configured to reflect a portion of laser light and transmit a portion of the light.

The pulse energy detector 190 may include a beam splitter 191 that is arranged on a light path of laser light outputted from the output coupling mirror (OC) 180, a condenser lens 192, and a photosensor 193.

The spectrum detector 200 may include a beam splitter 201 that is arranged on a light path of laser light outputted from the output coupling mirror (OC) 180, a condenser lens 202, and a spectroscope 203. The spectroscope 203 may include, for example, a diffuser plate, an air gap etalon, a condenser lens, and a line sensor that are not illustrated in the figure.

The pulse power module (PPM) 50 may include a charging condenser that is not illustrated in the figure, be connected to the discharge electrodes 20 and 21, and include a switch 51 configured to discharge the discharge electrodes 20 and 21.

The charger 220 may be connected to a charging condenser that is not illustrated in the figure but is provided in the pulse power module (PPM) 50.

A pressure sensor 230 is a sensor configured to measure a laser gas pressure in the laser chamber 10. A laser gas pressure measured by the pressure sensor 230 may be transmitted to the laser controller 240.

The laser chamber 10 is filled with a laser gas. A laser gas may be, for example, Ar or Kr as a rare gas, $F_2$ gas as a halogen gas, or Ne or He as a buffer gas, or may be a mixed gas thereof.

The laser gas supply and exhaust device 210 may include a valve and a flow control valve that are not illustrated in the figure. This device may be connected to a gas cylinder that contains a laser gas and is not illustrated in the figure and include a valve and a gas exhaust pump that are not illustrated in the figure.

The excimer laser device may output laser light to the light exposure device 300.

Figure 2:
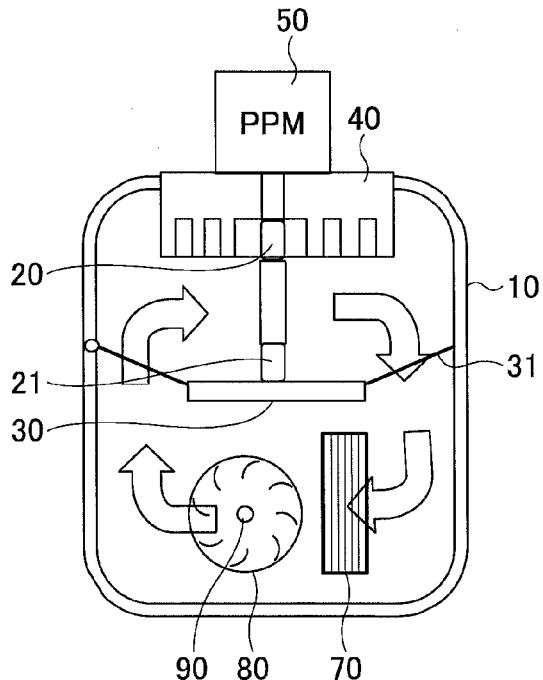
FIG. 2 is a diagram illustrating one example of a cross-sectional configuration of a laser chamber.

FIG. 2 is a diagram illustrating one example of a cross-sectional configuration of the laser chamber 10. As illustrated in FIG. 2, a heat exchanger 70 may be arranged inside the laser chamber 10. Furthermore, the lower electrode 21 may be supported by an electrode holder 30 from below and electrically connected to the laser chamber 10 by a wiring 31.

Furthermore, as illustrated in FIG. 2, a laser gas in the laser chamber 10 may circulate in the laser chamber 10 due to rotation of the cross flow fan 80. Additionally, a laser gas circulating in the laser chamber 10 may be cooled by the heat exchanger 70.

3.2 Operation

Next, an operation of an excimer laser device will be described with reference to FIG. 1 and FIG. 2.

The laser controller 240 may control laser gas supply and arranged devices when an instruction for preparation of oscillation of the laser device is received from the light exposure device controller 301. The laser controller 240 may supply a laser gas with a predetermined composition to an inside of the laser chamber 10 until a predetermined pressure is attained in the laser chamber 10.

The laser controller 240 may transmit a signal for magnetically floating the cross flow fan 80 and the shaft 90 and rotating the motor 140 to the magnetic bearing controller 150. The magnetic bearing controller 150 may conduct controls via the motor controller 160 in such a manner that a shaft of the cross flow fan 80 is magnetically floated and a rotational frequency of the cross flow fan 80 is a predetermined rotational frequency.

The laser controller 240 may receive a target pulse energy Et and an oscillation trigger from the light exposure device controller 301. The laser controller 240 may set a predetermined charging voltage (Vhv) for the charger 220 in such a manner that output laser light has the target pulse energy Et. Then, the switch 51 in a pulse power module (PPM) is operated in synchronization with the oscillation trigger to apply a higher voltage between the electrodes 20 and 21.

As a result, discharge is caused between the electrodes 20 and 21 to excite a laser gas and laser oscillation can be attained by the laser oscillator 250 that includes the output coupling mirror (OC) 180 and the grating 172. Herein, laser light with a narrowed line width due to the prism 171 and the grating 172 can be outputted from the output coupling mirror (OC) 180.

A portion of laser light outputted from the output coupling mirror (OC) 180 may be incident on the pulse energy detector 190 and partially reflected from the beam splitter 191, and pulse energy of laser light may be detected via the lens 192. Light transmitting through the beam splitter 191 may be incident on the light exposure device 300. Thus, pulse energy E of laser light outputted from the output coupling mirror (CC) can be detected by the pulse energy detector 190.

The laser controller 240 may store at least one of a charging voltage Vhv at that time and outputted pulse energy E. Furthermore, the laser controller 240 may conduct a feedback control of a charging voltage Vhv in such a manner that pulse energy E of outputted laser light is a target pulse energy Et based on a difference ΔE between the target pulse energy Et and a practically outputted energy E.

If the charging voltage Vhv is higher than a maximum value of an allowable range thereof, the laser controller 240 may control the laser gas supply and exhaust device 210 to supply a laser gas into an inside of the laser chamber 10 until a predetermined pressure is attained. Furthermore, if the charging voltage Vhv is lower than a minimum value of the allowable range thereof, the laser controller 240 may control the laser gas supply and exhaust device 210 to exhaust a laser gas from an inside of the laser chamber 10 until a predetermined pressure is attained.

A portion of laser light outputted from the output coupling mirror (OC) 180 may be sampled by the beam splitter 201 and be incident on the spectroscope 203. A center wavelength of laser light can be measured by the spectroscope 203.

The laser controller 240 can control the rotating stage 172 of the line narrowing module (LMN) 170 based on a difference $\Delta\lambda$ between a wavelength measured by a spectrum measuring device and a target wavelength to change an angle of incidence of laser light on the grating 173. As a result, a wavelength of laser light can be controlled by changing a selected wavelength on the grating 173.

The excimer laser device may not necessarily be a line narrowing laser device and may be an excimer laser device configured to output natural oscillation light. For example, a high-reflection mirror may be arranged instead of the line narrowing module (LNM) 170.

Due to such an operation, the excimer laser device can output laser light.

3.3 Problem

Next, a problem of a general excimer laser device used conventionally will be described.

Figure 3:
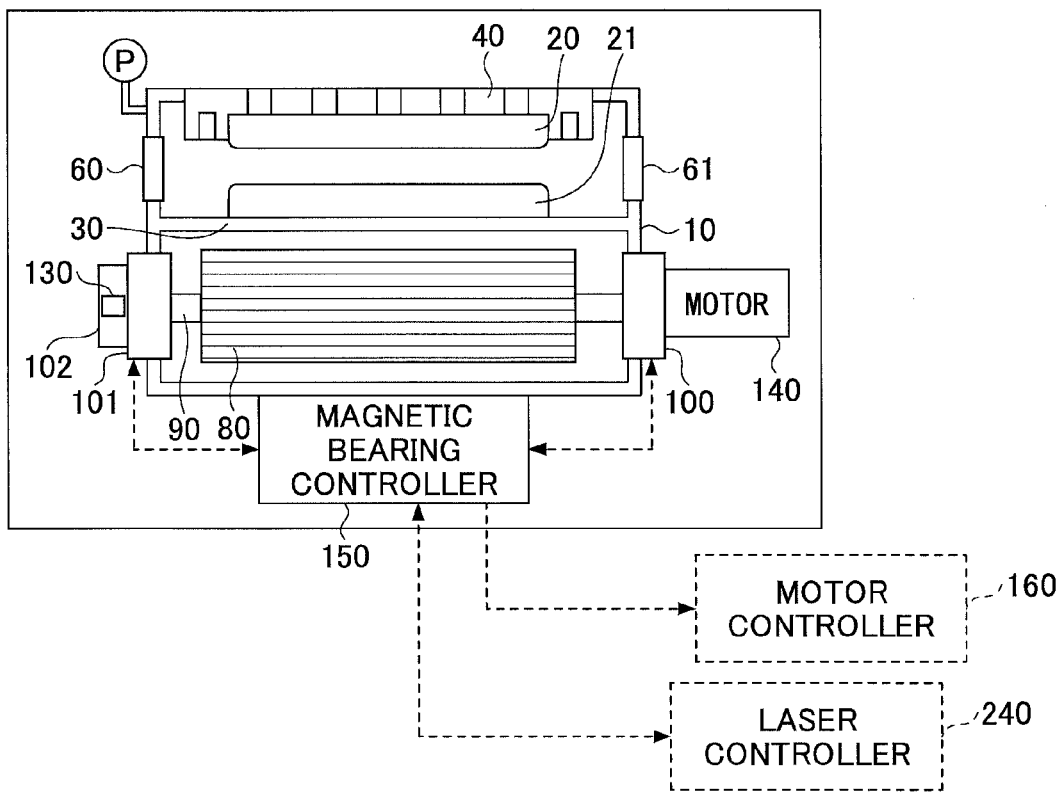
FIG. 3 is a diagram illustrating one example of a laser chamber of a general excimer laser device used conventionally and a periphery thereof.

FIG. 3 is a diagram illustrating one example of a laser chamber 10 of a general excimer laser device used conventionally and a periphery thereof. Additionally, in FIG. 3, an identical reference numeral will be attached to a component similar to that of FIG. 1 or 2 and a description(s) thereof will be omitted.

In FIG. 3, the cross flow fan 80 is provided in the laser chamber 10 and the shaft 90 of the cross flow fan 80 is magnetically floated and supported by magnetic bearings 100 and 101. The magnetic bearings 100 and 101 are bearings that float the shaft 90 due to a magnetic force thereof, rotate the shaft 90 due to a motor 140, and removably support the shaft 90 in a non-contact condition. The reason why magnetic bearings are employed in the excimer laser device will be described below. First, no abrasion of a ball is caused as compared with the case where a ball bearing is employed, so that lifetime of a magnetic bearing can be longer. Second, a substance that is an impurity for a laser gas is released from a lubricant for a ball bearing, causing an output of laser light to be reduced. Hence, magnetic bearings that support the shaft 90 in a non-contact condition are employed for the cross flow fan 80.

In order to float the shaft 90 magnetically in such magnetic bearings 100 and 101, it is necessary to apply electric current to an electromagnet included respectively in the magnetic bearings 100 and 101 to generate a magnetic buoyant force and control a magnitude of electric current constantly so that the shaft does not contact the magnetic bearing 100 or 101. The magnetic bearings 100 and 101 support the shaft in such a non-contact condition, so that a fine adjustment is frequently needed and one magnetic bearing controller 150 is generally provided for a pair of the magnetic bearings 100 and 101 as one set. Hence, the magnetic bearing controller 150 is installed integrally with the laser chamber 10 and a configuration is provided in such a manner that a pair of the magnetic bearings 100 and 101 in the installed laser chamber 10 is controlled on a one-to-one basis.

Hence, when the laser chamber 10 is replaced due to, for example, abrasion of electrodes 20 and 21 or the like, it is necessary to replace the magnetic bearing controller 150 adjusted for the laser chamber 10 together. Similarly, when the magnetic bearing controller 150 is broken down, it is necessary to replace the magnetic bearing controller 150 together with the laser chamber 10. Therefore, the same number of magnetic bearing controllers 150 as the number of a laser chamber(s) 10 is needed in a semiconductor factory for conducting a light exposure process.

Meanwhile, adjustment of the magnetic bearings 100 and 101 installed in the laser chamber 10 cannot be conducted in a semiconductor factory and has to be conducted in a factory of a laser maker. For example, when dust of the electrodes 20 and 21 attaches to the cross flow fan 80 due to abrasion of the electrodes 20 and 21 to change the weight or a position of a center of gravity thereof, a state of the cross flow fan 80 is changed to increase vibration of the laser chamber 10, but such an adjustment cannot be conducted in a semiconductor factory and only a method for dealing therewith is frequently to be brought to a laser maker.

Figure 4:
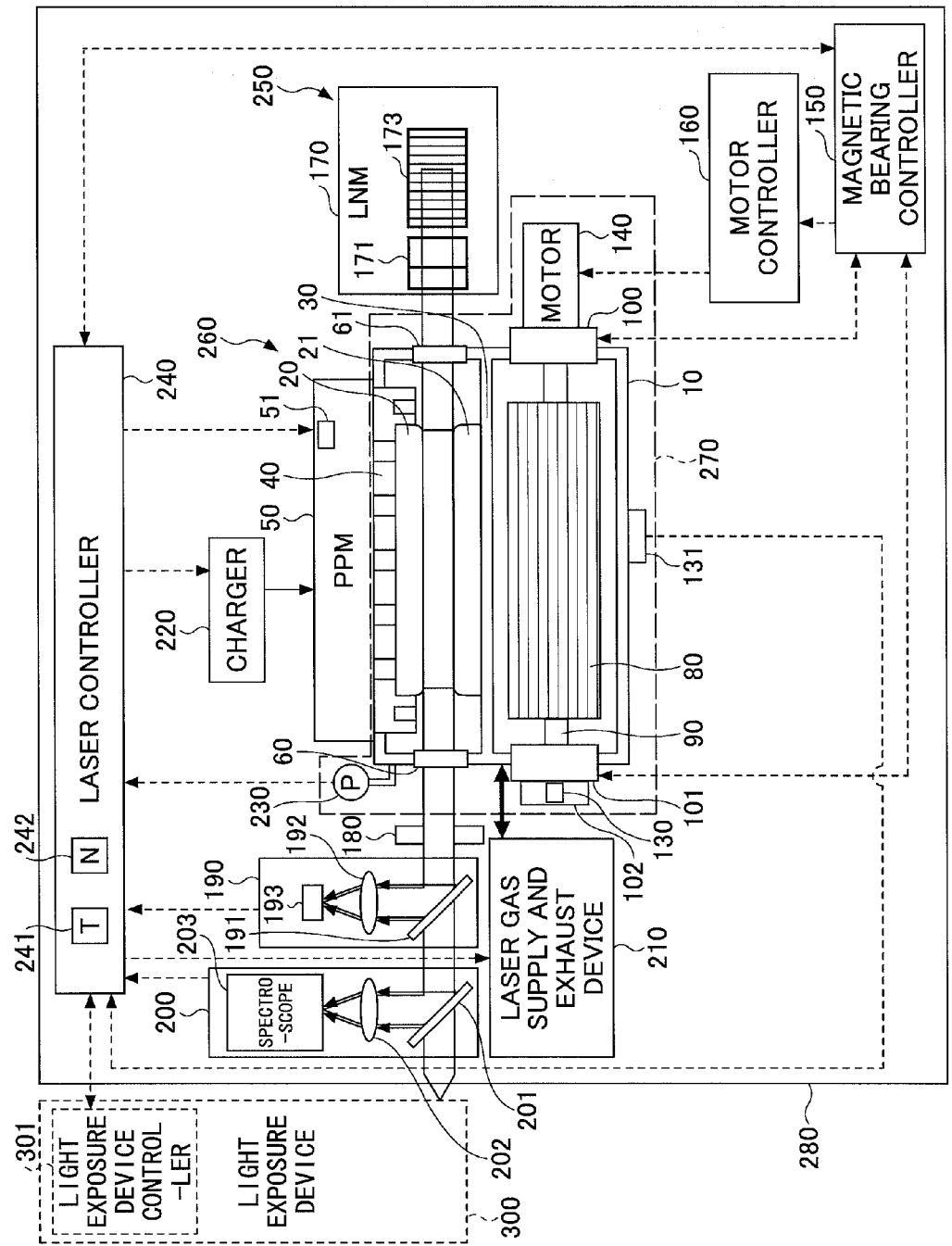
FIG. 4 is an entire configuration diagram illustrating one example of an excimer laser device according to the present embodiment.

Accordingly, a configuration as illustrated in FIG. 4 is employed in an excimer laser device according to the present embodiment to solve such a problem.

FIG. 4 is an entire configuration diagram illustrating one example of an excimer laser device according to the present embodiment. An excimer laser device according to the present embodiment in FIG. 4 is different from the excimer laser device illustrated in FIG. 1 to FIG. 3 in that a magnetic bearing controller 150 is provided separately from the laser chamber 10. Furthermore, it is also different from the excimer laser device illustrated in FIG. 1 to FIG. 3 in that a vibration sensor 131 is further provided in the laser chamber 10. Moreover, it is also different from the excimer laser device illustrated in FIG. 1 to FIG. 3 in that a laser frame 280 is illustrated as a housing configured to contain the entire excimer laser device. Furthermore, a timer 241 and a shot number counter 242 are specifically illustrated in the laser controller 240.

A configuration and a function of the magnetic bearing controller 150, per se, are similar to those of the magnetic bearing controllers 150 illustrated in FIG. 1 to FIG. 3, and hence, reference numerals similar to those of FIG. 1 to FIG. 3 will be attached thereto. Furthermore, other components are also similar to the components illustrated in FIG. 1 to FIG. 3, and accordingly, an identical reference numeral will be attached to each of them and a description(s) thereof will be omitted.

Furthermore, a replacement module 270 is illustrated in FIG. 4 as a region for replacing the laser chamber 10. As illustrated in FIG. 4, the replacement module 270 for replacing the laser chamber 10 includes electrodes 20 and 21, an electrode holder 30, a wiring 31, an electrical insulator 40, windows 60 and 61, a cross flow fan 80, shaft 90, magnetic bearings 100 and 101, a rotational frequency sensor 130, and a vibration sensor 131 that are provided integrally inside the laser chamber 10 or on the laser chamber 10. That is, the magnetic bearing controller 150 in the excimer laser device according to the present embodiment is not included in the replacement module 270. Then, the magnetic bearing controller 150 is installed in the laser frame 280 and configured to be separate from the laser chamber 10 but to be installed in the excimer laser device. Furthermore, the magnetic bearing controller 150 is configured to be separate from the laser chamber 10 but is electrically connected to the magnetic bearings 100 and 101 in the laser chamber 10 and is configured to be capable of controlling the magnetic bearings 100 and 101 per se.

Thus, the magnetic bearing controller 150 is provided to be separate from the laser chamber 10, so that the magnetic bearing controller 150 can be eliminated from the replacement module 270 of the laser chamber 10, and in the case of replacement of the laser chamber 10 (for example, at an end of life of the chamber 10 due to abrasion of the electrodes 20 and 21 or the like), the magnetic bearing controller 150 can be out of a target of replacement. Thereby, adjustment of a magnetic bearing installed in the laser chamber 10 is capable of being conducted in a semiconductor factory in which an excimer laser device is installed.

Herein, the vibration sensor 131 is a sensor configured to detect vibration of the laser chamber 10 and a detected value of the vibration sensor 131 may be sent to, for example, the laser controller 240. Thereby, a trouble state of the magnetic bearings 100 and 101 can also be detected based on vibration of the laser chamber 10 and a trouble of the magnetic bearings 100 and 101 can be detected from the viewpoint of a user for an excimer laser device.

Additionally, although an example of the vibration sensor installed in the laser chamber 10 has been provided in FIG. 4, the vibration sensor 131 is not necessarily essential and may be provided as necessary.

Furthermore, the timer 241 is a time measuring device configured to conduct a variety of time measurements and is used as a device configured to measure a period of time elapsed from replacement of the laser chamber 10 in the excimer laser device according to the present embodiment. However, it is also possible to be used for other purposes.

The shot number counter 242 is a device configured to count the number of an emission(s) of pulsed laser light (the number of a pulse (s)) outputted from the excimer laser device. The shot number counter 242 may be provided to count how many laser light pulses are outputted from replacement of the laser chamber 10. Here, each of the timer 241 and the shot number counter 242 is not necessarily essential and may be provided as necessary.

Figure 5:
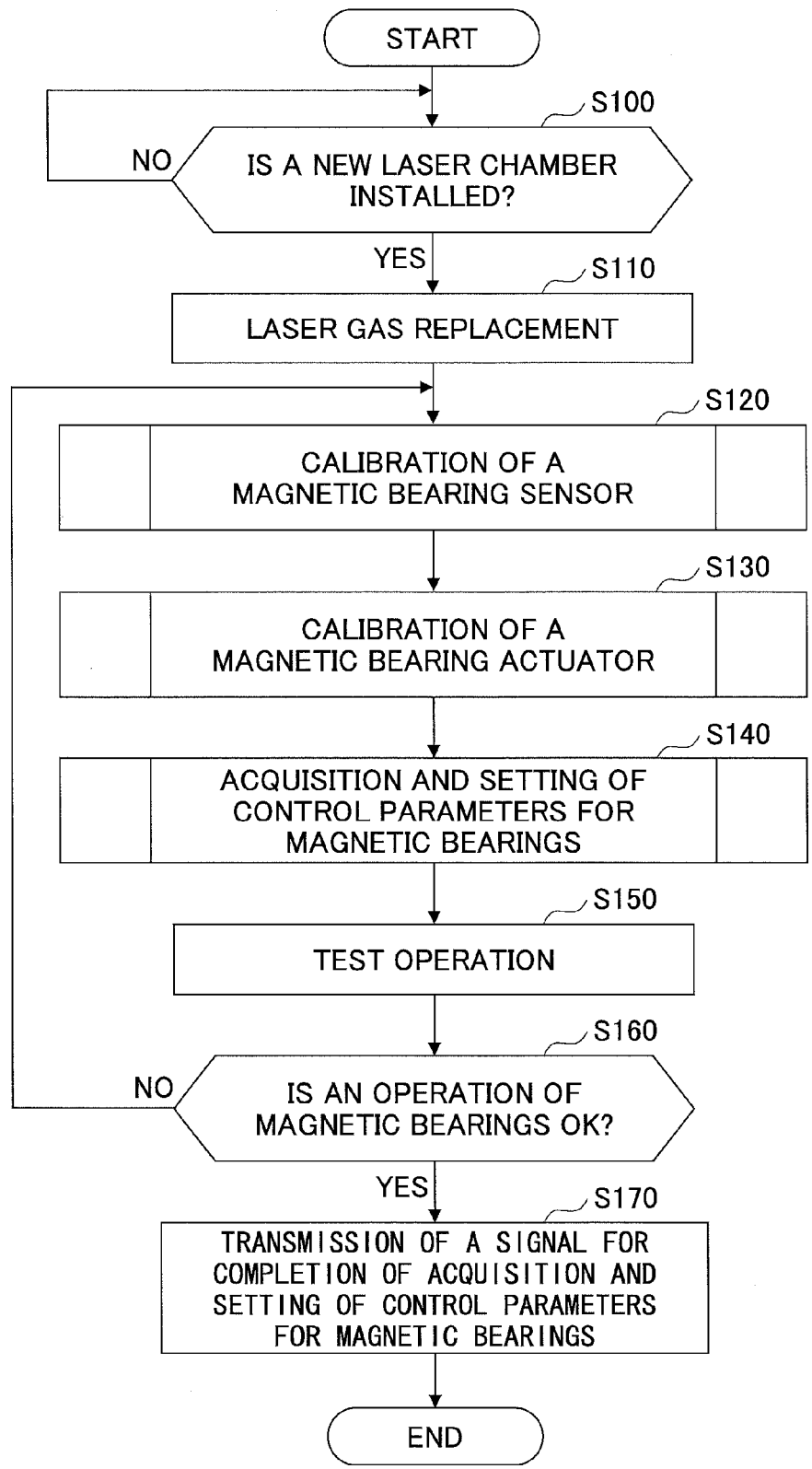
FIG. 5 is a diagram illustrating a flow at the time of replacement of a laser chamber in control flows for a laser controller of an excimer laser device that includes magnetic bearings according to the present embodiment.

4. Excimer Laser Device Including Magnetic Bearings
4.1 Control Flow of a Laser Controller
4.1.1 Flow at the Time of Replacement of a Laser Chamber FIG. 5 is a diagram illustrating a flow at the time of replacement of a laser chamber in control flows for a laser controller of an excimer laser device according to the present embodiment that includes magnetic bearings. Additionally, an identical reference numeral is attached to a component similar to an already described component, and hence, a description (s) thereof will be omitted.

At step S100, determination may be made as to whether or not a new laser chamber 10 is installed at the time of replacement of the laser chamber 10. "new" described herein means after replacement and does not necessarily mean a newly purchased one, thereby including both a laser chamber 10 that is newly installed after replacement when repair, check, adjustment, or the like is completed for the replacement, and a newly purchased laser chamber 10. Additionally, whether or not a new laser chamber 10 is installed may be determined by, for example, a proximity switch or the like. At step S100, when installation of a new laser chamber 10 is detected, going to step S110 may be conducted, or when not detected, the condition may be standby at step S100 to repeat the flow.

At step S110, replacement of a laser gas may be conducted. The laser chamber 10 whose repair, check, adjustment or the like has been completed is installed to be ready to be used practically, and hence, replacement with a laser gas to be used practically may be conducted. Preferably, replacement with a laser gas may be conducted so as to provide a maximum pressure of the laser chamber to be used practically. Furthermore, for example, a main component of a laser gas is Ne gas, and hence, only Ne gas that contains a rare gas (Kr or Ar) may be subjected to gas replacement so as to provide a maximum gas pressure.

At step S120, calibration of a magnetic bearing sensor may be conducted. The magnetic bearing sensor is a sensor that includes a displacement sensor configured to detect displacement of the shaft 90 and is associated with a control of the magnetic bearings, and will be described below. Additionally, calibration of the magnetic bearing sensor may be instructed in such a manner that a laser controller 240 causes a magnetic bearing controller 150 to conduct calibration of the magnetic bearing sensor.

At step S130, calibration of a magnetic bearing actuator may be conducted. The magnetic bearing actuator is an actuator configured to float the shaft 90 magnetically, and for example, an electric magnet is used. Details of calibration of the magnetic bearing actuator, per se, will be described later, and calibration of the magnetic bearing actuator may be conducted in such a manner that the laser controller 240 instructs the magnetic bearing controller 150 to conduct calibration of the magnetic bearing actuator.

At step S140, acquisition and setting of control parameters for magnetic bearings 100 and 101 may be conducted. Control parameters for the magnetic bearings mean a variety of control values for controlling the magnetic bearings 100 and 101. Hence, for acquisition of the control parameters, target values of a variety of control values are calculated to conduct a change to control parameters calculated by setting of the control parameters. Additionally, acquisition and setting of control parameters may be conducted in such a manner that the laser controller 240 instructs the magnetic bearing controller 150 to conduct acquisition and setting of the control parameters for the magnetic bearings 100 and 101.

At step S150, a test operation may be conducted for newly set control parameters. The laser controller 240 may transmit a cross flow fan rotation signal to the magnetic bearing controller 150 to start a rotational operation of the cross flow fan 80.

At step S160, determination may be made as to whether or not an operation of the magnetic bearings 100 and 101 is conducted appropriately. That is, a rotational operation of the magnetic bearings 100 and 101 is confirmed. At step S160, when an operation of the magnetic bearings 100 and 101 is determined to be normal, going to step S170 may be conducted. On the contrary, when determination is made not to be normal, returning to step S120 may be conducted to restart the flow from calibration of the magnetic bearing sensor.

At step S170, a signal for completion of acquisition and setting of the control parameters for the magnetic bearings may be transmitted to a light exposure device 300. An operation of the magnetic bearings 100 and 101 is confirmed to be normal at step S160, and hence, the laser controller 240 may transmit a signal for completion of acquisition and setting of the control parameters for the magnetic bearings to a light exposure device controller 301.

The laser controller 240 may conduct such a control flow at the time of replacement of a laser chamber.

4.1.2 Flow for a Certain Number of Shot or a Certain Period of Time

Figure 6:
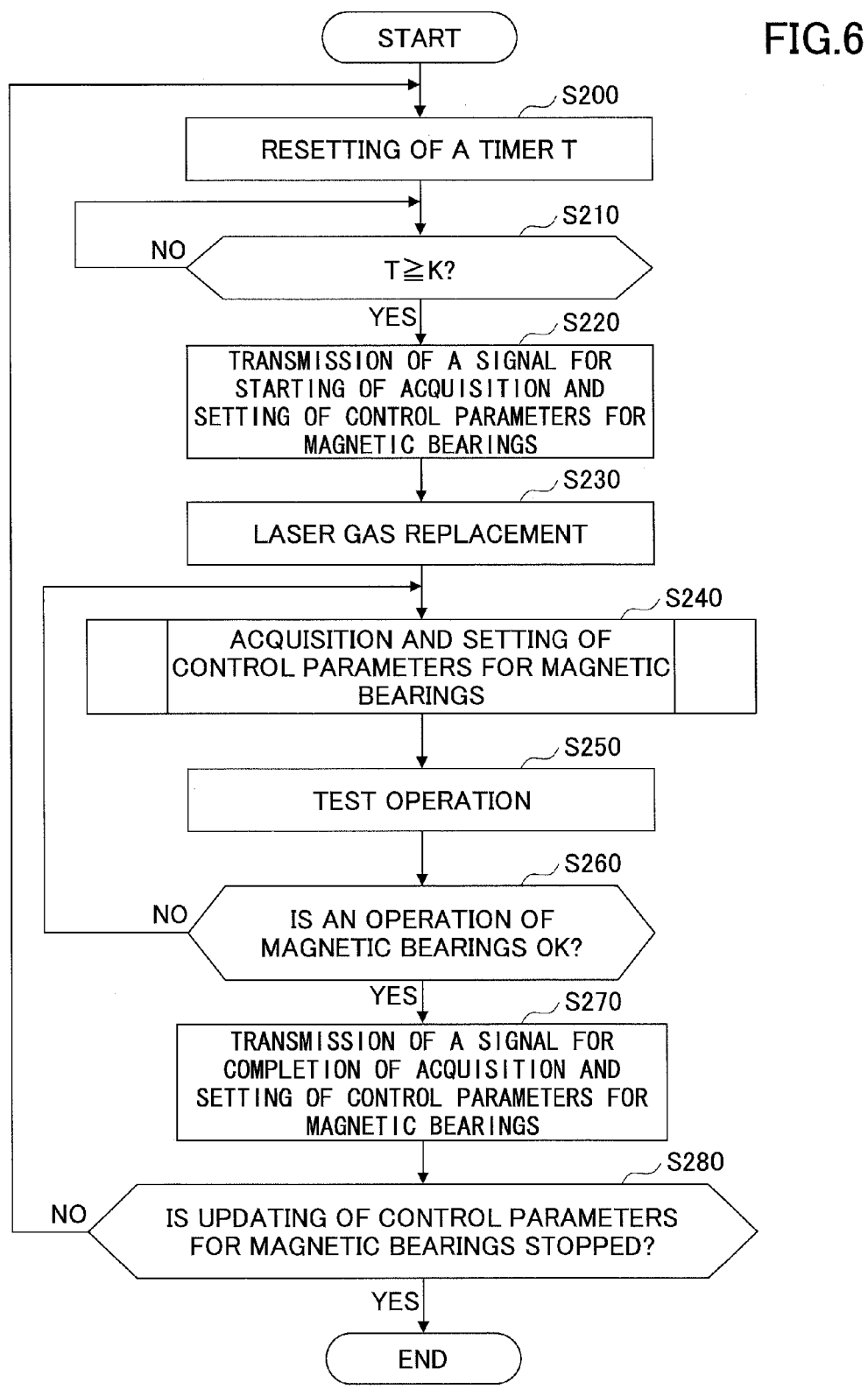
FIG. 6 is a diagram illustrating a processing flow to be executed by a laser controller when a process of determination of a timing of resetting of control parameters for magnetic bearings and the resetting are executed.

FIG. 6 is a diagram illustrating a processing flow to determine as to whether or not it is a time when resetting of control parameters for magnetic bearings should be conducted and to be executed by a laser controller when the resetting is conducted.

If a particle such as a fine dust is generated by an operation of generation of laser light in a laser chamber 10 and attached to the cross flow fan 80, a center of gravity or a weight of the cross flow fan 80 may be changed and thereby a decentering or the like may be caused. In such a case, conventionally, there has been only a method to conduct cleaning of the cross flow fan 80 to recover a condition that the cross flow fan 80 rotates normally. However, resetting of control parameters is conducted in an excimer laser device according to the present embodiment, so that it is possible to conduct an operation continuously without cleaning even on the condition that a slight amount of particles attaches thereto.

FIG. 6 illustrates a series of processing flows to determine a time of resetting of control parameters for the cross flow fan 80 and conduct the resetting of the control parameters.

At step S200, resetting of a measurement value T of a timer 241 in a laser controller 240 may be conducted. That is, T=0 is executed and measurement of the timer 241 is started.

At step S210, determination may be conducted as to whether or not a measurement value of the timer 241 is greater than or equal to a predetermined time period T. That is, when hour(s) or more has/have passed from installation of a laser chamber 10, determination may be made to be a time of updating and setting of control parameters for magnetic bearings of a cross flow fan 80. Additionally, a predetermined value K may be, for example, a predetermined value within 1000-10000 hours.

When determination is made to be K≤T at step S210, going to step S220 may be conducted. When determination is made to be T<K, the condition may be standby at step S210 to repeat the processing flow until K≤T is satisfied.

At step S220, a signal for starting acquisition and setting of control parameters for magnetic bearings may be transmitted.

At step S230, replacement of a laser gas for the laser chamber 10 may be conducted. However, when the laser chamber 10 is filled with a laser gas, no replacement of a laser gas may be conducted and step S230 will be omitted.

At step S240, acquisition and setting of control parameters for the magnetic bearings may be conducted. This matter is similar to the matter described for step S140 in FIG. 5, and hence, a description(s) thereof will be omitted.

At step S250, a test operation of the cross flow fan 80 may be conducted. This matter is similar to the matter described for step S150 in FIG. 5, and hence, a description(s) thereof will be omitted.

At step S260, confirmation of an operation of the magnetic bearings 100 and 101 may be conducted. This matter is similar to the matter described for step S160 in FIG. 5, and hence, a description(s) thereof will be omitted.

At step S270, a signal of completion of acquisition and setting of the control parameters for the magnetic beatings may be transmitted. This matter is similar to the matter described for step S170 in FIG. 5, and hence, a description(s) thereof will be omitted.

At step S280, determination is made as to whether or not updating of the control parameters for the magnetic bearings should be stopped. That is, if a predetermined or more amount of particles attach to the cross flow fan 80 even when resetting of the control parameters for the magnetic bearings is repeated, adjustment reaches a limit. In such a case, countermeasures such as stopping of resetting of the magnetic bearings 100 and 101, removing of the laser chamber 10, and conducting of cleaning of the cross flow fan 80 are needed. Hence, if the number of a resetting(s) of the control parameters for the magnetic bearings 100 and 101 is, for example, greater than or equal to a predetermined number, stopping of updating of the control parameters for the magnetic bearings, replacing of the laser chamber 10, and cleaning of the cross flow fan 80 are conducted. Such a determination is made at step S280, and the processing flow is ended in the case where updating of the control parameters for the magnetic bearings is stopped. The processing flow is repeated from step S200 in the case where the updating is not stopped.

Additionally, after completion of the processing flow, for example, the laser chamber 10 is replaced and particles attaching to the cross flow fan 80 may be washed out or eliminated in a laser factory.

Figure 7:
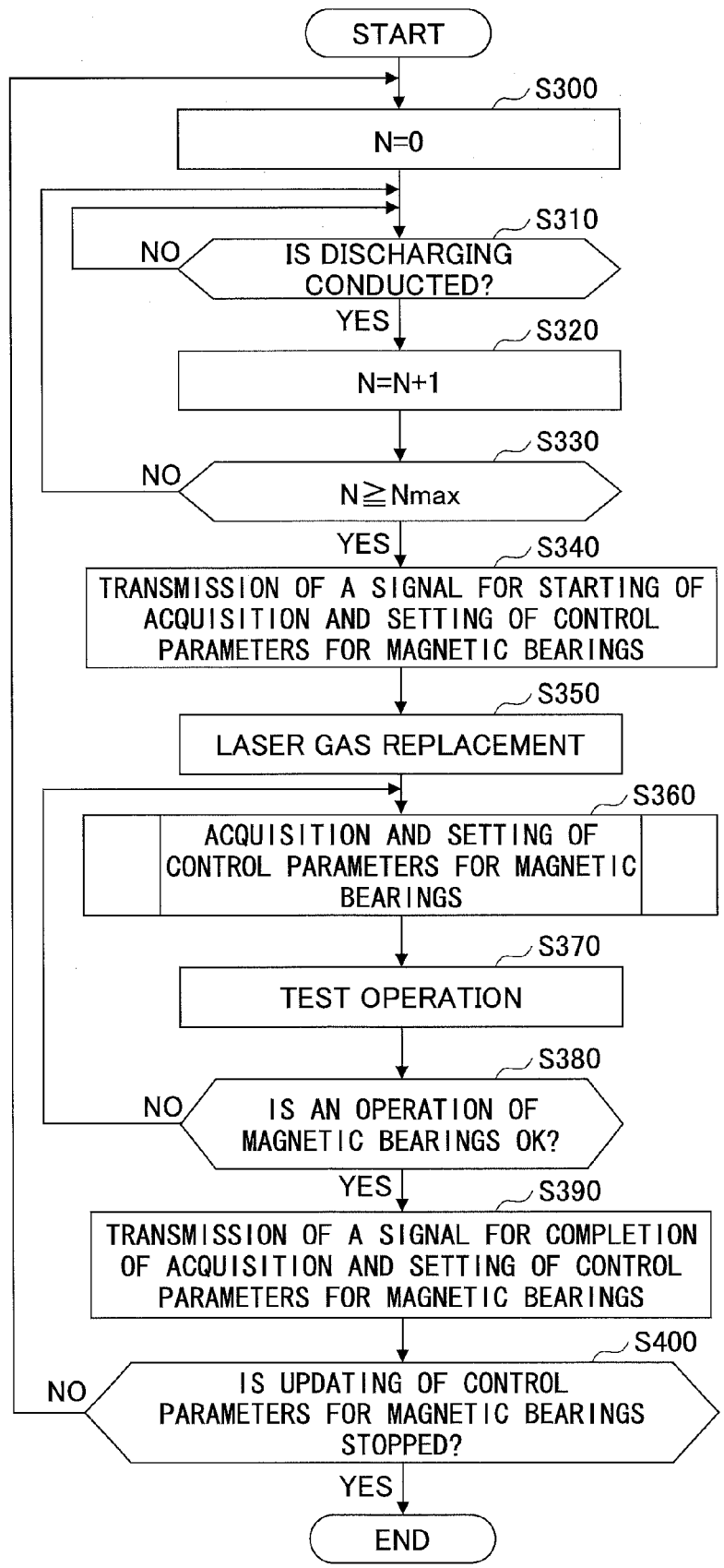
FIG. 7 is a diagram illustrating a processing flow to be executed by a laser controller in the case where a timing of readjustment of magnetic bearings is determined depending on the number of shot(s) of laser light irradiation to execute the readjustment.

FIG. 7 is a diagram illustrating a processing flow to be executed by a laser controller in the case where timing of readjustment of magnetic bearings is determined depending on a shot number of laser light irradiation and the readjustment is conducted.

At step S300, a shot number count value N of the shot number counter 242 in the laser controller 240 is reset at N=0.

At step S310, determination is made as to whether or not discharging is initiated in a laser chamber 10. Additionally, initiation of discharging may be determined based on, for example, whether or not the switch 51 is operated. At step S310, going to step S320 may be conducted in the case where discharging is initiated, or the condition may be standby at step S310 to repeat the processing flow in the case where discharging is not initiated.

At step S320, the shot number count value N of the shot number counter 242 is increased by one so that N=N+1.

At step S330, whether or not the number of a discharging (s), namely, the shot number count value N, is greater than or equal to a predetermined maximum value $N_{max}$ may be determined. Additionally, a maximum value $N_{max}$ of the number of a discharging (s) may be a predetermined shot number among $1 \times 10^9$-$60 \times 10^9$ shots. At step S330, going to step S340 may be conducted in the case where determination of $N_{max} \leq N$ is made, and returning to step S310 may be conducted to count the number of a discharging(s) until $N_{max} \leq N$ is satisfied in the case where determination of $N < N_{max}$ is made.

At step S340, a signal for starting acquisition and setting of control parameters for the magnetic bearings 100 and 101 may be transmitted. This step is similar to step S220 in FIG. 6.

At step S350, replacement of a laser gas may be conducted as necessary. This step is similar to step S230 in FIG. 6, and hence, a description(s) thereof will be omitted.

At step S360, acquisition and setting of the control parameters for the magnetic bearings 100 and 101 may be conducted. This step is similar to the matter described for step S140 in FIG. 5, and hence, a description(s) thereof will be omitted.

At step S370, a test operation of a cross flow fan 80 may be conducted. This step is similar to the matter described for step S150 in FIG. 5, and hence, a description(s) thereof will be omitted.

At step S380, confirmation may be conducted as to whether or not an operation of the magnetic bearings is non-problematic. This step is similar to the matter described for step S160 in FIG. 5, and hence, a description(s) thereof will be omitted.

At step S390, a signal for completion of acquisition and setting of the control parameters for the magnetic bearings may be transmitted. This step is similar to the matter described for step S170 in FIG. 5, and hence, a description(s) thereof will be omitted.

At step S400, determination is made as to whether or not updating of the control parameters for the magnetic bearings should be stopped. This step is similar to step S280 in FIG. 6, and hence, a matter(s) thereof will be omitted.

Thus, determination may be conducted as to whether or not it is necessary to conduct resetting of the control parameters for the magnetic bearings 100 and 101 on the basis of a shot number of pulsed laser light.

4.1.3 Flow at the Time of Changing of a Laser Gas Pressure

Figure 8:
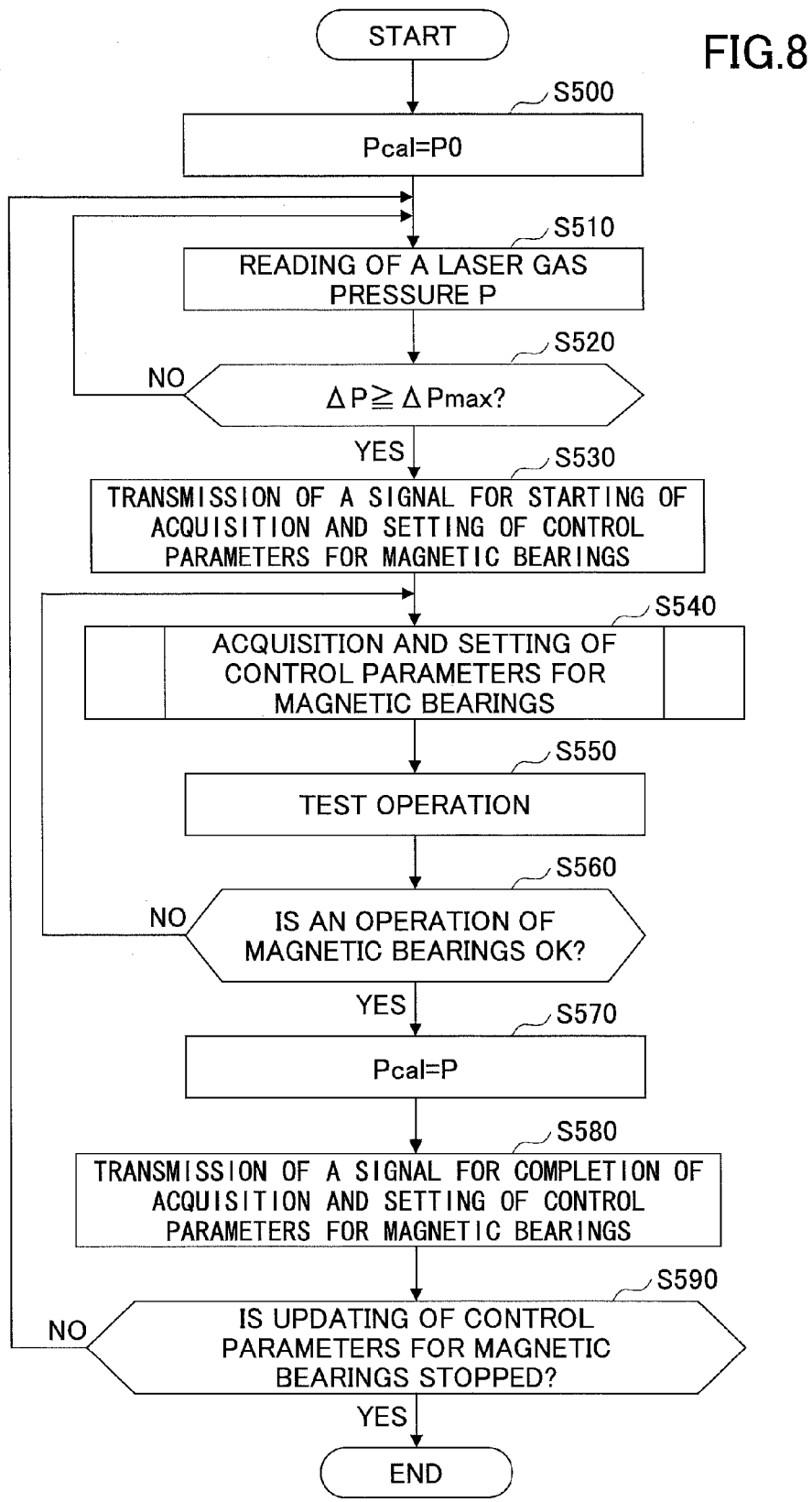
FIG. 8 is a diagram illustrating one example of a processing flow to be executed by a laser controller when a laser gas pressure is changed.

FIG. 8 is a diagram illustrating one example of a processing flow to be executed by a laser controller in the case where a laser gas pressure is changed in an excimer laser device according to the present embodiment.

If the electrodes 20 and 21 in the laser chamber 10 are abraded in an operation of an excimer laser device or an impurity is generated in a laser gas, a laser gas pressure in the laser chamber 10 is frequently increased to keep a laser output. As the laser gas pressure is increased, a more amount of power is needed for the cross flow fan 80 to circulate the laser gas, so that power consumption is increased. Hence, it is considered that a state of operation of the magnetic bearings 100 and 101 is also changed, and hence, resetting of the control parameters for the magnetic bearings 100 and 101 is needed. FIG. 8 illustrates one example of a processing flow in the case where such a laser gas pressure is changed.

At step S500, a pressure Pcal at the time of calibration may be a laser gas pressure P0 at the time of first calibration.

At step S510, a current laser gas pressure P in the laser chamber 10 is read from the pressure sensor 230.

At step S520, determination may be made as to whether or not a difference $\Delta P(=P-Pcal)$ between a calibrated pressure Pcal inside the laser chamber 10 at the time of previous calibration and a current pressure P is higher than a predetermined maximum pressure difference $\Delta P_{max}$. Herein, the predetermined maximum pressure difference $\Delta P_{max}$ may be set at, for example, 100-200 kPa. Furthermore, calculation may be conducted as Pcal=P0 in a first processing flow, as described in step S500.

At step S530, a signal for starting acquisition and setting of the control parameters for the magnetic bearings may be transmitted. This step is similar to step S220 in FIG. 6.

At step S540, acquisition and setting of the control parameters for the magnetic bearings 100 and 101 may be conducted. This step is similar to the matter described for step S140 in FIG. 5, and hence, a description(s) thereof will be omitted.

At step S550, a test operation of the cross flow fan 80 may be conducted. This step is similar to the matter described for step S150 in FIG. 5, and hence, a description(s) thereof will be omitted.

At step S560, confirmation may be conducted as to whether or not an operation of magnetic bearings is normal. This step is similar to the matter described for step S160 in FIG. 5, and hence, a description (s) thereof will be omitted. At step S560, going to step S570 is conducted in the case where an operation of the magnetic bearings is normal, and returning to step S540 may be conducted to restart from acquisition and setting of the control parameters for the magnetic bearings in the case where it is not normal.

At step S570, a calibrated pressure Pcal is replaced by a current pressure P so that Pcal=P.

At step S580, a signal for completion of acquisition and setting of the control parameters for the magnetic bearings may be transmitted. This step is similar to the matter described for step S170 in FIG. 5, and hence, a description(s) thereof will be omitted.

At step S590, determination is made as to whether or not updating of the control parameters for the magnetic bearings should be stopped. This step is similar to step S280 in FIG. 6, and hence, the matter will be omitted. At step S590, when determination is made in such a manner that updating of the control parameters for the magnetic bearings should be stopped, the processing flow is ended accordingly, and when determination is made in such a manner that it should not be stopped, returning to step S510 is conducted to repeat the processing flow from reading of a laser gas pressure P. Thus, resetting of the control parameters for the magnetic bearings may be conducted based on a change in the laser gas pressure.

4.1.4 Flow Based on Detection of a Vibration Sensor

Figure 9:
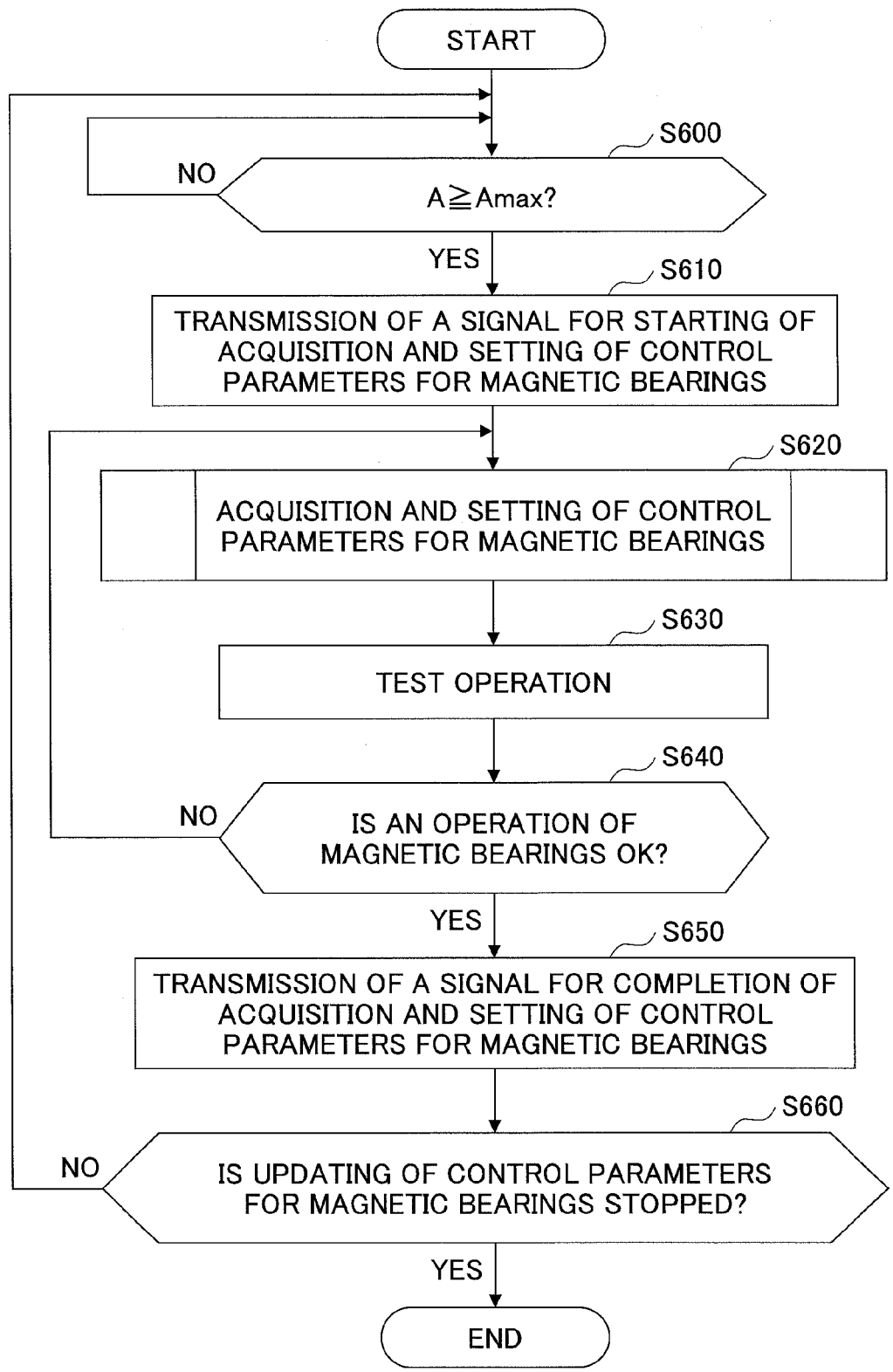
FIG. 9 is a diagram illustrating one example of a processing flow to be executed by a laser controller when vibration of a laser chamber is detected.

FIG. 9 is a diagram illustrating one example of a processing flow to be executed by a laser controller when a vibration of a laser chamber 10 is detected in an excimer laser device according to the present embodiment.

In the case where vibration of the laser chamber 10 is detected by a vibration sensor 131, it is also just conceivable that vibration of the laser chamber 10 is caused by vibration of a cross flow fan 80. Hence, in the case where vibration of the laser chamber 10 is detected, resetting of control parameters for magnetic bearings 100 and 101 may be conducted in the processing flow illustrated in FIG. 9.

At step S600, determination may be as to whether or not a detection acceleration A of the vibration sensor 131 installed in the laser chamber 10 is greater than or equal to a predetermined acceptable maximum value $A_{max}$. At step S600, going to step S610 is conducted, in the case where the detection acceleration A is greater than or equal to the acceptable maximum value $A_{max}$, that is, $A_{max} \leq A$. In the case of $A<A_{max}$, the condition may be standby to repeat step S600.

At step S610, a signal for starting acquisition and setting of the control parameters for the magnetic bearings 100 and 101 may be transmitted. This step is similar to step S220 in FIG. 6.

At step S620, acquisition and setting of the control parameters for the magnetic bearings 100 and 101 may be conducted. This step is similar to the matter described for step S140 in FIG. 5, and hence, a description(s) thereof will be omitted.

At step S630, a test operation of the cross flow fan 80 may be conducted. This step is similar to the matter described for step S150 in FIG. 5, and hence, a description(s) thereof will be omitted.

At step S640, confirmation may be conducted as to whether or not an operation of the magnetic bearings is normal. This step is similar to the matter described for step S160 in FIG. 5, and hence, a description(s) thereof will be omitted. At step S640, going to step S650 is conducted in the case where an operation of the magnetic bearings is normal, and returning to step S620 may be conducted to restart acquisition and setting of the control parameters for the magnetic bearings in the case where it is not normal.

At step S650, a signal for completion of acquisition and setting of the control parameters for the magnetic bearings may be transmitted. This step is similar to the matter described for step S170 in FIG. 5, and a description(s) thereof will be omitted.

At step S660, determination is made as to whether or not updating of the control parameters for the magnetic bearings should be stopped. This step is similar to step S280 in FIG. 6, and hence, a description (s) thereof will be omitted. At step S660, when determination is conducted in such a manner that updating of the control parameters for the magnetic bearings should be stopped, the processing flow is ended accordingly, and when determination is made in such a manner that it should not be stopped, returning to step S600 is conducted to repeat the processing flow. Thus, resetting of the control parameters for the magnetic bearings may be conducted based on detection of vibration of the vibration sensor 131.

4.1.5 Flow Based on a Value of Energy Stability

Figure 10:
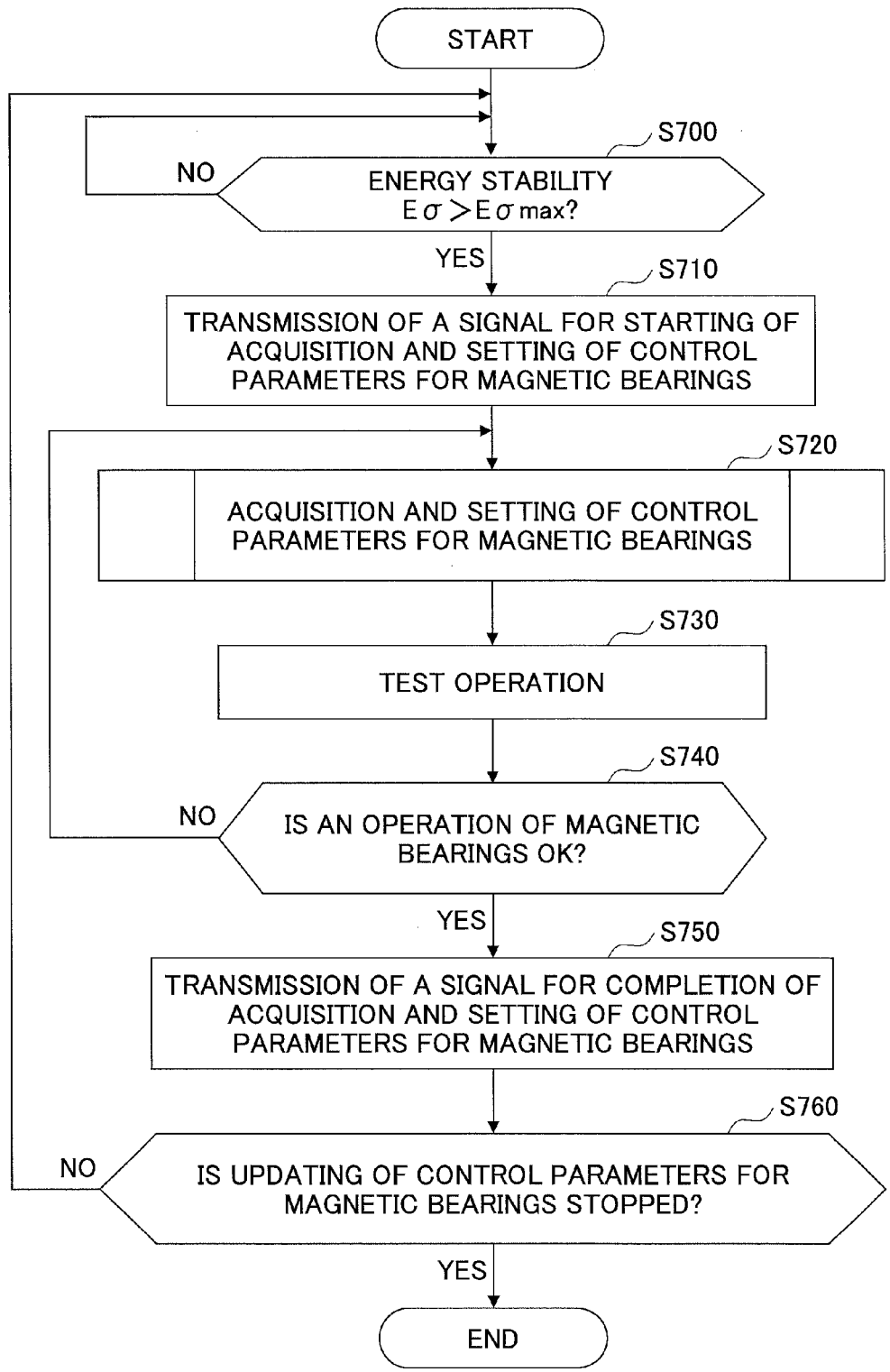
FIG. 10 is a diagram illustrating one example of a processing flow to be executed by a laser controller based on a value of energy stability of laser light.

FIG. 10 is a diagram illustrating one example of a processing flow to be executed by a laser controller based on a value of energy stability of laser light in an excimer laser device according to the present embodiment.

In the case where energy stability of laser light outputted from an excimer laser device is degraded, it is also considered as one factor that an operation of the magnetic bearings 100 and 101 is unstable. For example, when vibration of the laser chamber 10 is increased, a laser oscillator can be vibrated. As a result, energy stability $E\sigma$ of laser light is degraded, and hence, degradation of a control of the magnetic bearings can be monitored by monitoring the energy stability.

Hence, FIG. 10 illustrates one example of a processing flow for conducting resetting of control parameters for the magnetic bearings 100 and 101 based on energy stability of laser light.

At step S700, determination may be made as to whether or not pulse energy stability $E\sigma$ of laser light is greater than a maximum value $E\sigma_{max}$. That is, determination may be made as to whether or not $E\sigma_{max} < E\sigma$ is satisfied. Here, the energy stability Ea may be a standard deviation of energy measured by the pulse energy detector 190 for a predetermined number of samples.

At step S700, going to step S710 is conducted in the case where $E\sigma_{max} < E\sigma$ is satisfied, and the condition is standby at step S700 in the case where $E\sigma \leq E\sigma_{max}$ is satisfied.

At step S710, a signal for starting acquisition and setting of the control parameters for the magnetic bearings 100 and 101 may be transmitted. This step is similar to step S220 in FIG. 6.

At step S720, acquisition and setting of the control parameters for the magnetic bearings 100 and 101 may be conducted. This step is similar to the matter described for step S140 in FIG. 5, and hence, a description(s) thereof will be omitted.

At step S730, a test operation of the cross flow fan 80 may be conducted. This step is similar to the matter described for step S150 in FIG. 5, and hence, a description(s) thereof will be omitted.

At step S740, confirmation may be made as to whether or not an operation of the magnetic bearings is normal. This step is similar to the matter described for step S160 in FIG. 5, and hence, a description(s) thereof will be omitted. At step S740, going to step S750 is conducted in the case where an operation of the magnetic bearings is normal, and returning to step S720 may be conducted to restart from acquisition and setting of the control parameters for the magnetic bearings in the case where it is not normal.

At step S750, a signal for completion of acquisition and setting of the control parameters for the magnetic bearings may be transmitted. This step is similar to the matter described for step S170 in FIG. 5, and hence, a description(s) thereof will be omitted.

At step S760, determination may be made as to whether or not updating of the control parameters for the magnetic bearings should be stopped. This step is similar to step S280 in FIG. 6, and a description(s) thereof will be omitted. At step S760, when determination is made in such a manner that updating of the control parameters for the magnetic bearings should be stopped, the processing flow is ended accordingly, and when determination is made in such a manner that it should not be stopped, returning to step S700 may be conducted to repeat the processing flow.

Thus, resetting of the control parameters for the magnetic bearings may be conducted based on a pulse energy stability $E\sigma$ of laser light.

4.1.6 Flow Based on a Value of Wavelength Stability

Figure 11:
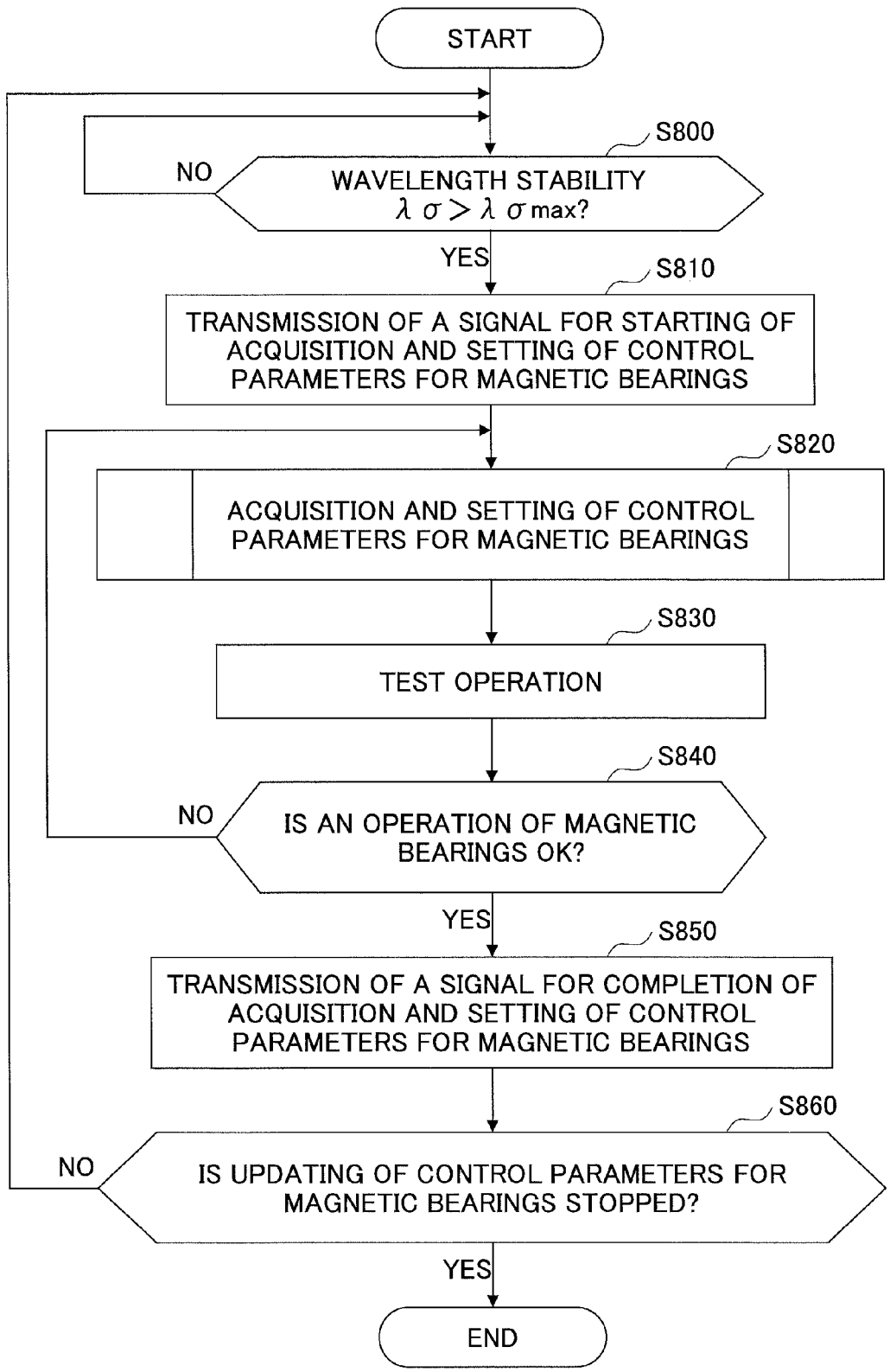
FIG. 11 is a diagram illustrating one example of a processing flow to be executed by a laser controller based on a value of wavelength stability of laser light.

FIG. 11 is a diagram illustrating one example of a processing flow to be executed by a laser controller based on a value of wavelength stability of laser light in an excimer laser device according to the present embodiment.

In the case where wavelength stability of laser light outputted from an excimer laser device is degraded, it is also considered as one factor that an operation of the magnetic bearings 100 and 101 is unstable. For example, if vibration of the laser chamber 10 is increased, a laser oscillator can be vibrated. As a result, stability of a center wavelength of laser light is degraded, and hence, degradation of a control of magnetic bearings can be monitored by monitoring the stability of a center wavelength of laser light.

Hence, FIG. 11 illustrates one example of a processing flow for conducting resetting of control parameters for the magnetic bearings 100 and 101 based on wavelength stability of laser light.

At step S800, determination may be made as to whether or not stability $\lambda$ of a center wavelength of laser light is greater than a maximum value $\lambda\sigma_{max}$. That is, determination may be made as to whether or not $\lambda\sigma_{max} < \lambda\sigma$ is satisfied. Here, the wavelength stability $\lambda\sigma$ may be a value of standard deviation of a center wavelength measured by a spectrum detector 200 for a predetermined number of samples.

At step S800, going to step S810 is conducted in the case where $\lambda\sigma_{max} < \lambda\sigma$ is satisfied, and the condition may be standby at step S800 in the case of $\lambda\sigma \leq \lambda\sigma_{max}$.

At step S810, a signal for starting acquisition and setting of the control parameters for the magnetic bearings 100 and 101 may be transmitted. This step is similar to step S220 in FIG. 6.

At step S820, acquisition and setting of the control parameters for the magnetic bearings 100 and 101 may be conducted. This step is similar to the matter described for step S140 in FIG. 5, and hence, a description(s) thereof will be omitted.

At step S830, a test operation of the cross flow fan 80 may be conducted. This step is similar to the matter described for step S150 in FIG. 5, and hence, a description(s) thereof will be omitted.

At step S840, confirmation as to whether or not an operation of the magnetic bearings is normal may be conducted. This step is similar to the matter described for step S160 in FIG. 5, and hence, a description(s) thereof will be omitted. At step S840, going to step S850 is conducted in the case where an operation of the magnetic bearings is normal, and returning to step S820 may be conducted to restart acquisition and setting of the control parameters for the magnetic bearings in the case where it is not normal.

At step S850, a signal for completion of acquisition and setting of the control parameters for the magnetic bearings may be transmitted. This step is similar to the matter described for step S170 in FIG. 5, and hence, a description(s) thereof will be omitted.

At step S860, determination may be made as to whether or not updating of the control parameters for the magnetic bearings should be stopped. This step is similar to step S280 in FIG. 6, and hence, a description(s) thereof will be omitted. At step S860, when determination is made in such a manner that updating of the control parameters for the magnetic bearings should be stopped, the processing flow is ended accordingly, and when determination is made in such a manner that it should not be stopped, returning to step S800 may be conducted to repeat the processing flow.

Thus, resetting of the control parameters for the magnetic bearings may be conducted based on a wavelength stability $\lambda\sigma$ of laser light.

4.1.7 Flow at the Time of an Error Output from a Magnetic Bearing Controller

Figure 12:
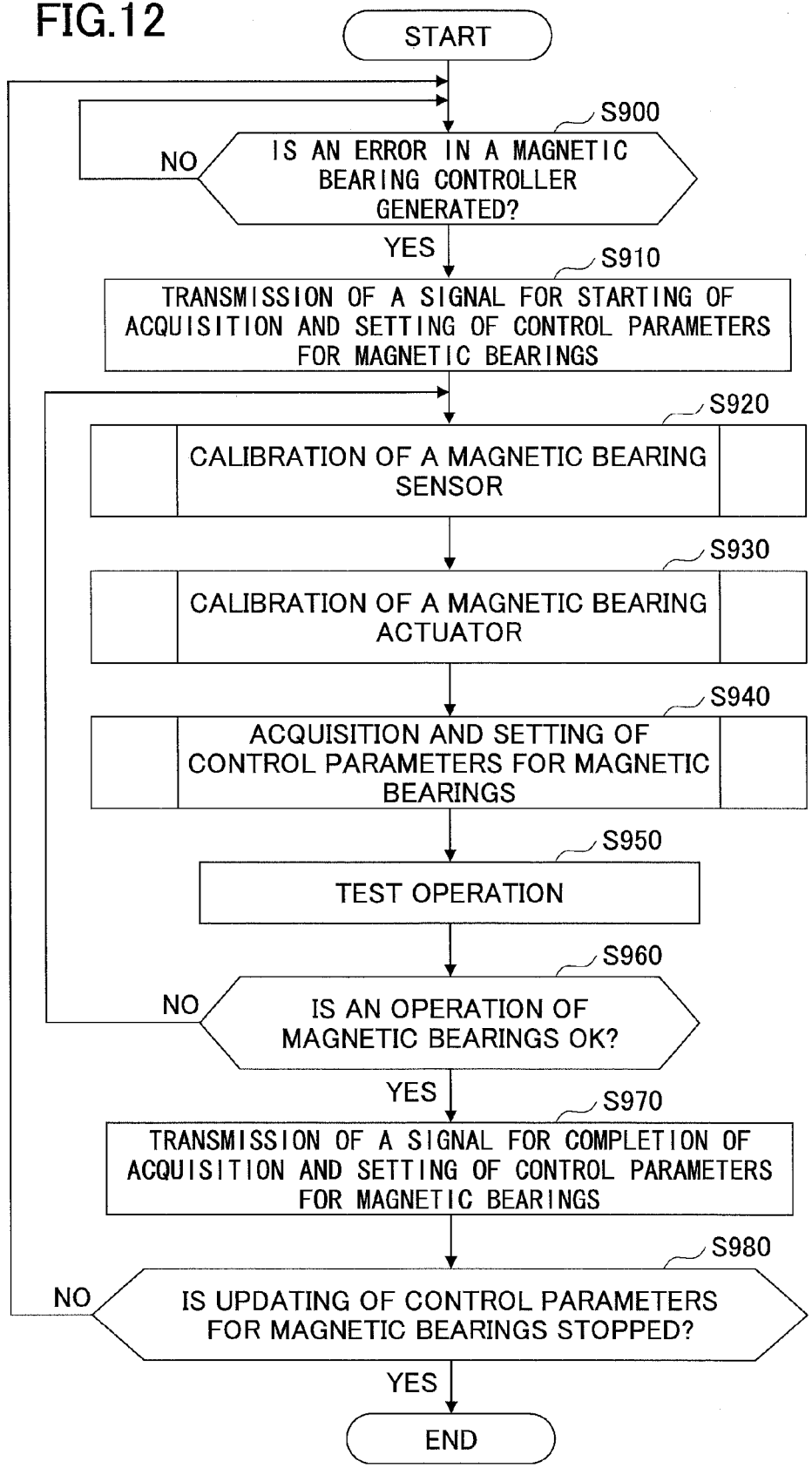
FIG. 12 is a diagram illustrating one example of a processing flow to be executed by a laser controller at the time of an error output from a magnetic bearing controller.

FIG. 12 is a diagram illustrating one example of a processing flow to be executed by a laser controller at the time of an error output from a magnetic bearing controller in an excimer laser device according to the present embodiment.

When a magnetic bearing controller 150 outputs an error, it means that deficiency is caused in the magnetic bearings 100 and 101, and hence, resetting of the control parameters for the magnetic bearings 100 and 101 is needed obviously. FIG. 12 illustrates one example of a processing flow in the case where an error is outputted from the magnetic bearing controller 150.

At step S900, determination may be made as to whether or not an error is generated in the magnetic bearing controller 150. For example, when a detection value of a displacement sensor of the magnetic bearings 100 and 101 is greater than a predetermined range for stably operating the magnetic bearings 100 and 101, an error is outputted from the magnetic bearing controller 150 and generation of an error is determined based thereon. At step S900, going to step S910 may be conducted in the case where determination is made in such a manner that an error is caused in the magnetic bearing controller 150. In the case where determination is made in such a manner that no error is caused, the condition is standby at step S900 to repeat the process of step S900.

At step S910, a signal for starting acquisition and setting of control parameters for the magnetic bearings 100 and 101 may be transmitted. This step is similar to step S220 in FIG. 6.

At step S920, calibration of the magnetic bearing sensor may be conducted. This step is similar to step S120 in FIG. 5, and hence, a description(s) thereof will be omitted.

At step S930, calibration of a magnetic bearing actuator may be conducted. This step is similar to step S130 in FIG. 5, and hence, a description(s) thereof will be omitted.

At step S940, acquisition and setting of the control parameters for the magnetic bearings 100 and 101 may be conducted. This step is similar to the matter described for step S140 in FIG. 5, and hence, a description(s) thereof will be omitted.

At step S950, a test operation of a cross flow fan 80 may be conducted. This step is similar to the matter described for step S150 in FIG. 5, and hence, a description(s) thereof will be omitted.

At step S960, confirmation may be conducted as to whether or not an operation of the magnetic bearings is normal. This step is similar to the matter described for step S160 in FIG. 5, and hence, a description(s) thereof will be omitted. At step S960, going to step S970 may be conducted in the case where an operation of the magnetic bearings is normal, and returning to step S920 may be conducted to restart from acquisition and setting of the control parameters for the magnetic bearings in the case where it is not normal.

At step S970, a signal for completion of acquisition and setting of the control parameters for the magnetic bearings may be transmitted. This step is similar to the matter described for step S170 in FIG. 5, and hence, a descriptions) thereof will be omitted.

At step S980, determination may be made as to whether or not updating of the control parameters for the magnetic bearings should be stopped. This step is similar to step S280 in FIG. 6, and hence, the matter will be omitted. At step S980, when determination is made in such a manner that updating of the control parameters for the magnetic bearings should be stopped, the processing flow is completed accordingly, and when determination is made in such a manner that it should not be stopped, returning to step S900 may be conducted to repeat the processing flow.

Thus, calibration of the sensor, calibration of the actuator, and resetting of control parameters for magnetic bearings may be conducted based on an error detection of the magnetic bearing controller 150.

4.1.8 Flow at the Time of Touchdown

Figure 13:
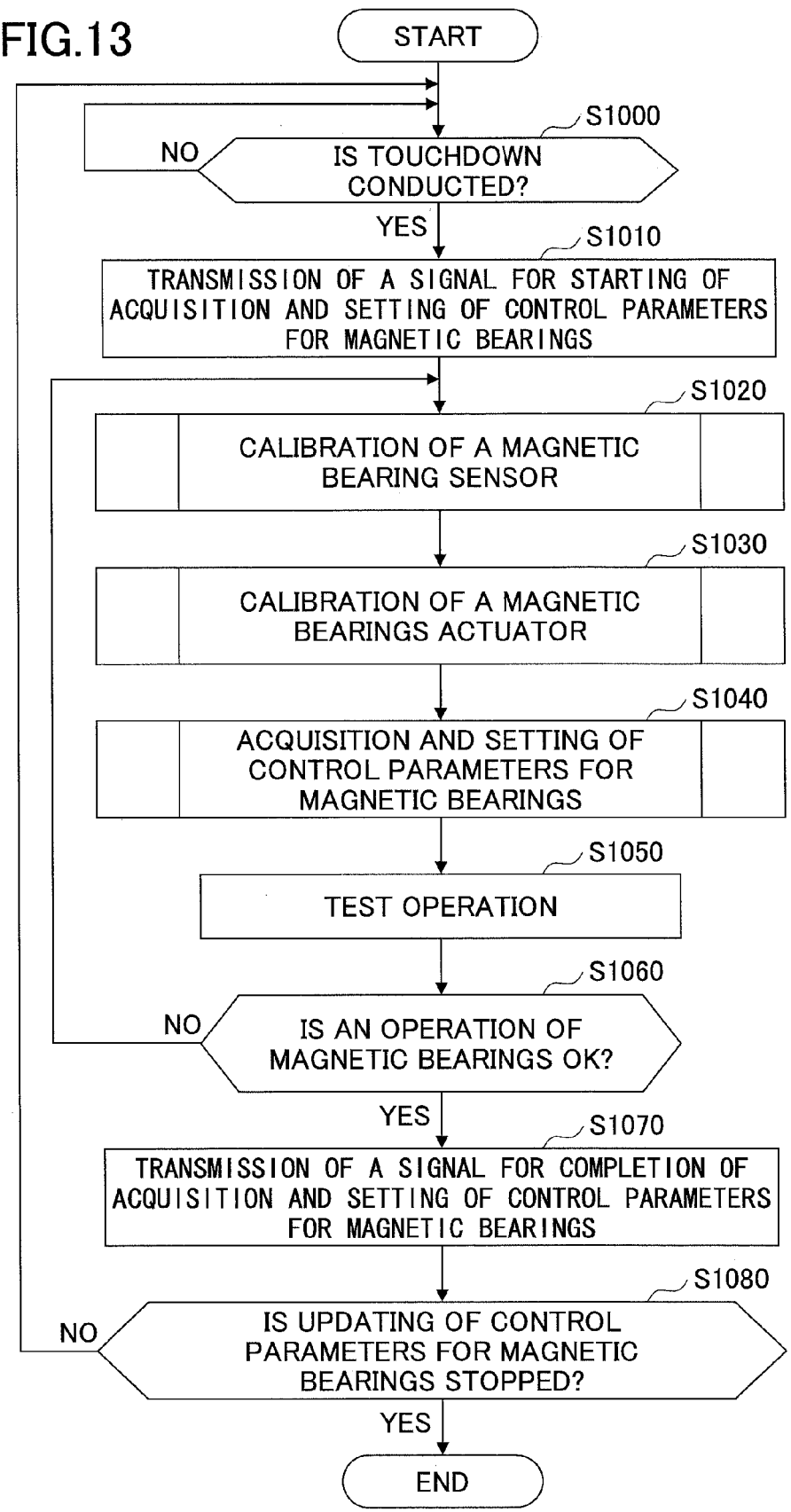
FIG. 13 is a diagram illustrating one example of a processing flow to be executed by a laser controller at the time of touchdown of magnetic bearings.

FIG. 13 is a diagram illustrating one example of a processing flow to be executed by a laser controller at the time of touchdown of magnetic bearings in an excimer laser device according to the present embodiment.

Contact-type touchdown bearings are further installed at the outside of magnetic bearings 100 and 101 in an axial direction thereof, so that a rotor and a stator do not directly contact in such a manner that both of them are broken, even when a magnetic buoyant force of the magnetic bearings 100 and 101 is suddenly caused to vanish due to caused blackout or the like. In the case where a shaft 90 contacts such touchdown bearings, that is, so-called touchdown is caused, it is also considered that control parameters for the magnetic bearings 100 and 101 are influenced, and hence, it is preferable to conduct resetting of the control parameters for the magnetic bearings 100 and 101. FIG. 13 illustrates one example of a processing flow in the case where touchdown is caused on the magnetic bearings 100 and 101.

At step 1000, determination may be made as to whether or not touchdown is caused on the magnetic bearings 100 and 101. When touchdown is caused, the caused touchdown can be detected by a magnetic bearing controller 150 using a displacement sensor or the like, and hence, when touchdown is detected by, for example, the magnetic bearing controller 150, going to step S1010 may be conducted. When determination is made in such a manner that touchdown is not caused, the condition may be standby at step S1000 to repeat the processing of step S1000.

At step S1010, a signal for starting acquisition and setting of the control parameters for the magnetic bearings 100 and 101 may be transmitted. This step is similar to step S220 in FIG. 6.

At step S1020, calibration of a magnetic bearing sensor may be conducted. This step is similar to step S120 in FIG. 5, and hence, a description(s) thereof will be omitted.

At step S1030, calibration of a magnetic bearing actuator may be conducted. This step is similar to step S130 in FIG. 5, and hence, a description(s) thereof will be omitted.

At step S1040, acquisition and setting of the control parameters for the magnetic bearings 100 and 101 may be conducted. This step is similar to the matter described for step S140 in FIG. 5, and hence, a description(s) thereof will be omitted.

At step S1050, a test operation of the cross flow fan 80 may be conducted. This step is similar to the matter described for step S150 in FIG. 5, and hence, a description(s) thereof will be omitted.

At step S1060, confirmation may be conducted as to whether or not an operation of the magnetic bearings is normal. This step is similar to the matter described for step S160 in FIG. 5, and hence, a description(s) thereof will be omitted. At step S1060, going to step S1070 is conducted in the case where an operation of the magnetic bearings is normal, and returning to step S1020 may be conducted to restart from acquisition and setting of the control parameters for the magnetic bearings in the case where it is not normal.

At step S1070, a signal for completion of acquisition and setting of the control parameters for the magnetic bearings may be transmitted. This step is similar to the matter described for step S170 in FIG. 5, and hence, a description(s) thereof will be omitted.

At step S1080, determination may be made whether or not updating of the control parameters for the magnetic bearings should be stopped. This step is similar to step S280 in FIG. 6, and hence, the matter will be omitted. At step S1080, when determination is made in such a manner that updating of the control parameters for the magnetic bearings should be stopped, the processing flow is ended accordingly, and when determination is made in such a manner that it should not be stopped, returning to step S1000 may be conducted to repeat the processing flow.

Thus, calibration of a sensor, calibration of an actuator, and resetting of the control parameters for the magnetic bearings may be conducted based on detection of touchdown by the magnetic bearing controller 150.

4.2 Acquisition and Setting of Control Parameters for Magnetic Bearings

Figure 14:
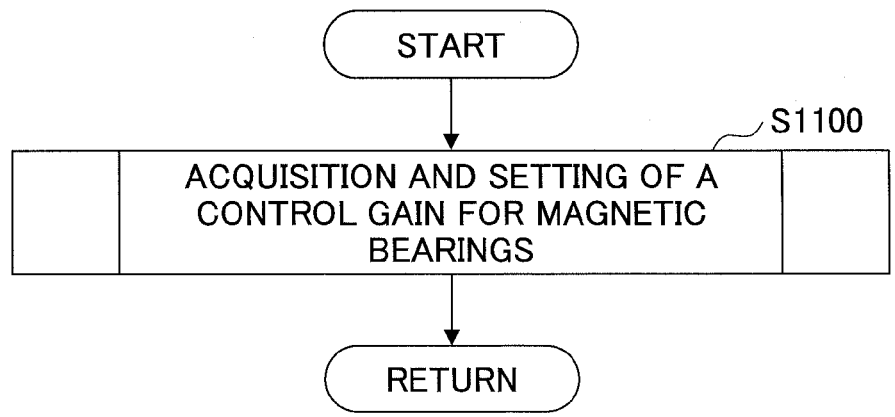
FIG. 14 is a diagram illustrating a first processing flow for explaining a processing step of acquisition and setting of control parameters for magnetic bearings in more detail.

FIG. 14 is a diagram illustrating a first processing flow for explaining in more detail processing steps of acquisition and setting of control parameters for magnetic bearings illustrated by step S140 in FIG. 5, step S240 in FIG. 6, step S360 in FIG. 7, step S40 in FIG. 8, step S620 in FIG. 9, step S720 in FIG. 10, step S820 in FIG. 11, step 940 in FIG. 12, and step S1040 in FIG. 13.

At step S1100 in FIG. 14, acquisition and setting of control gains for the magnetic bearings 100 and 101 are conducted. This process is a processing flow for being controlled in such a manner that a position of a geometrical center of the shaft 90 of the cross flow fan 80 is fixed, and control gains for the magnetic bearings 100 and 101 are acquired and set, thereby enabling such a control.

Figure 15:
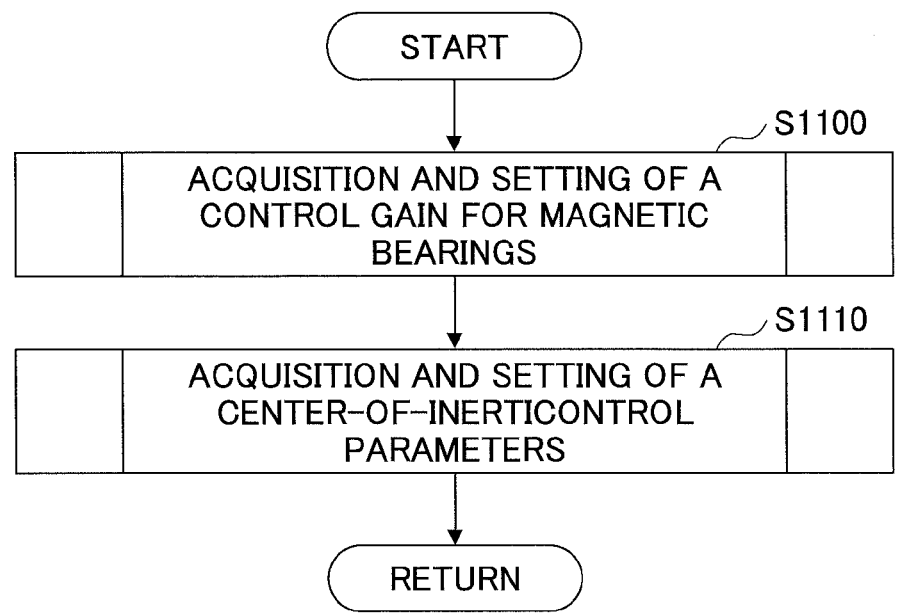
FIG. 15 is a diagram illustrating a second processing flow for explaining a processing step of acquisition and setting of control parameters for magnetic bearings in more detail, similarly to FIG. 14.

FIG. 15 is a diagram illustrating a second processing flow for explaining in more detail processing steps of acquisition and setting of control parameters for magnetic bearings similarly to FIG. 14.

Step S1100 in FIG. 15 is a process identical to step S1100 illustrated in FIG. 14, and hence, an identical step number is attached thereto. Also in the processing flow in FIG. 15, first, acquisition and setting of control gains for the magnetic bearings 100 and 101 are conducted to provide a condition that it is possible to be controlled in such a manner that a position of a geometrical center of the shaft 90 of the cross flow fan 80 is fixed.

At step S1110, acquisition and setting of a center-of-inertia control parameter may be conducted. In a center-of-inertia control, the control is such that a position of a center-of-inertia of the cross flow fan 80 is fixed. For example, it is preferable to conduct the center-of-inertia control in the following cases. The first case is that positions of a geometrical center of the shaft 90 of the cross flow fan 80 and a center of inertia of the cross flow fan 80 are not identical from the first time. The second case is that a displacement between a geometrical center and a center-of-inertia of the cross flow fan 80 is caused by weights of particles when the particles attach to a portion of the cross flow fan 80 due to abrasion of discharge electrodes. The third case is that a displacement between positions of a geometrical center and a center-of-inertia of the cross flow fan 80 is gradually caused by deforming of the shaft 90 of the cross flow fan 80. In such cases, according to a center-of-inertia control, a control is conducted in such a manner that the shaft 90 is rotated not to fix a geometrical center but to fix a center-of-inertia. When such a center-of-inertia control is conducted, it is possible to stabilize rotation and reduce vibration of the cross flow fan 80 by conducting a center-of-inertia control depending on the state of each step, even in the case where positions of a center of inertia and a geometrical center are not identical from the first time or the case where a center of inertia is changed with time passage from the time of replacement of the laser chamber 10.

In order to conduct such a center-of-inertia control, a center-of-inertia control parameter may be acquired at step S1110. Then, when the cross flow fan 80 is rotated, a center-of-inertia control may be conducted by using an acquired center-of-inertia control parameter in order to conduct laser oscillation.

5. Control System for Magnetic Bearings

Figure 16:
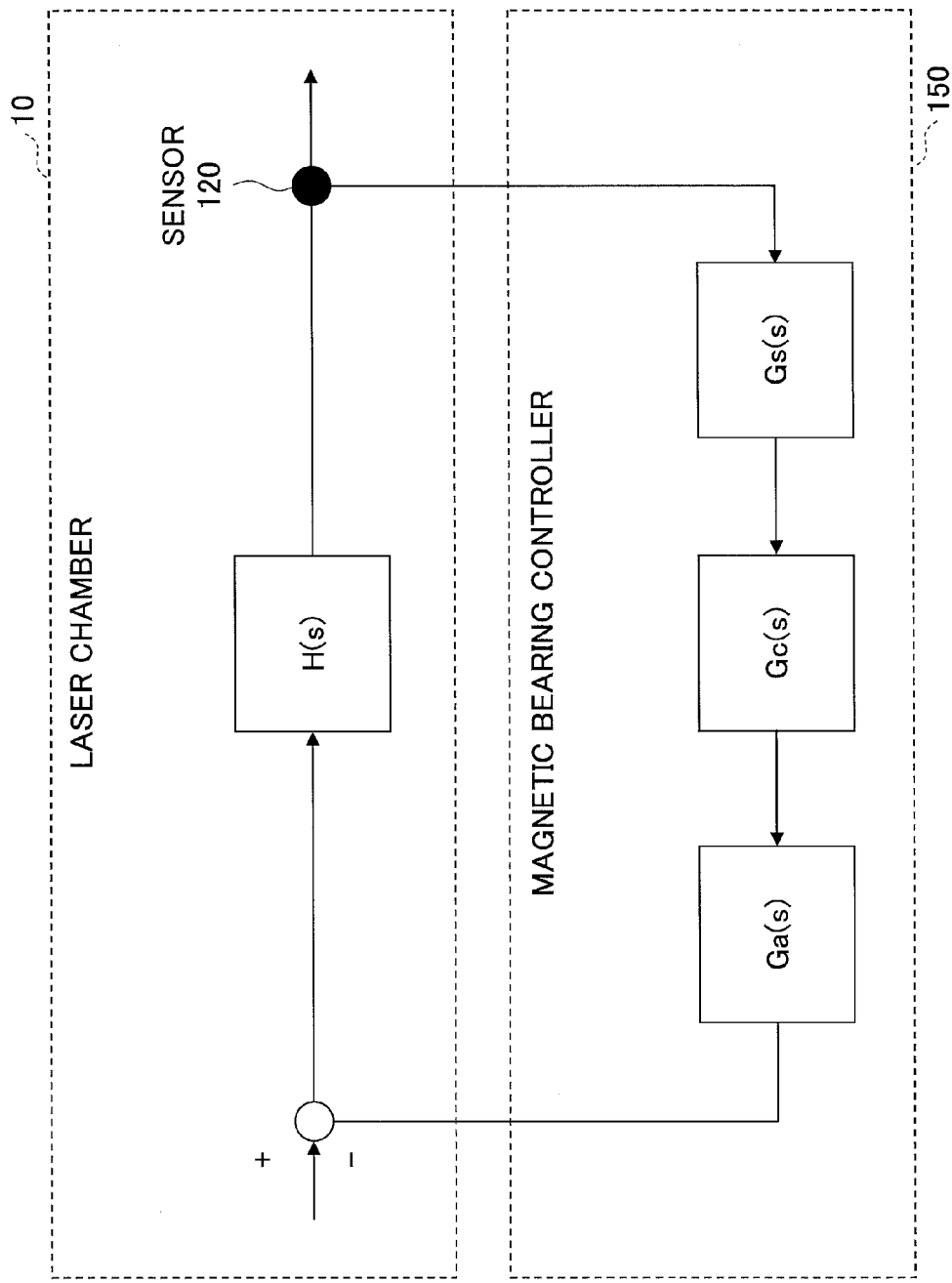
FIG. 16 is a control block diagram illustrating one example of a magnetic bearing control system of an excimer laser device according to the present embodiment.

FIG. 16 is a control block diagram illustrating one example of a magnetic bearing control system of an excimer laser device according to the present embodiment. FIG. 16 illustrates a block diagram of a feedback control system composed of a laser chamber 10 and a bearing controller 150. Additionally, a displacement sensor 120 configured to detect displacement of the shaft 90 is further provided in the laser chamber 10.

While Ga(s), Gc(s), and Gs(s) in a bearing controller 150, and H(s) in the laser chamber 10 are a sensor driving frequency response function, a control system frequency response function, an actuator driving frequency response function, and a chamber (rotor) frequency response function, respectively, in FIG. 16, a magnetic bearing control system is illustrated in FIG. 16. For example, a control system for magnetic bearings of an excimer laser device according to the present embodiment is composed of such a block.

Figure 17:
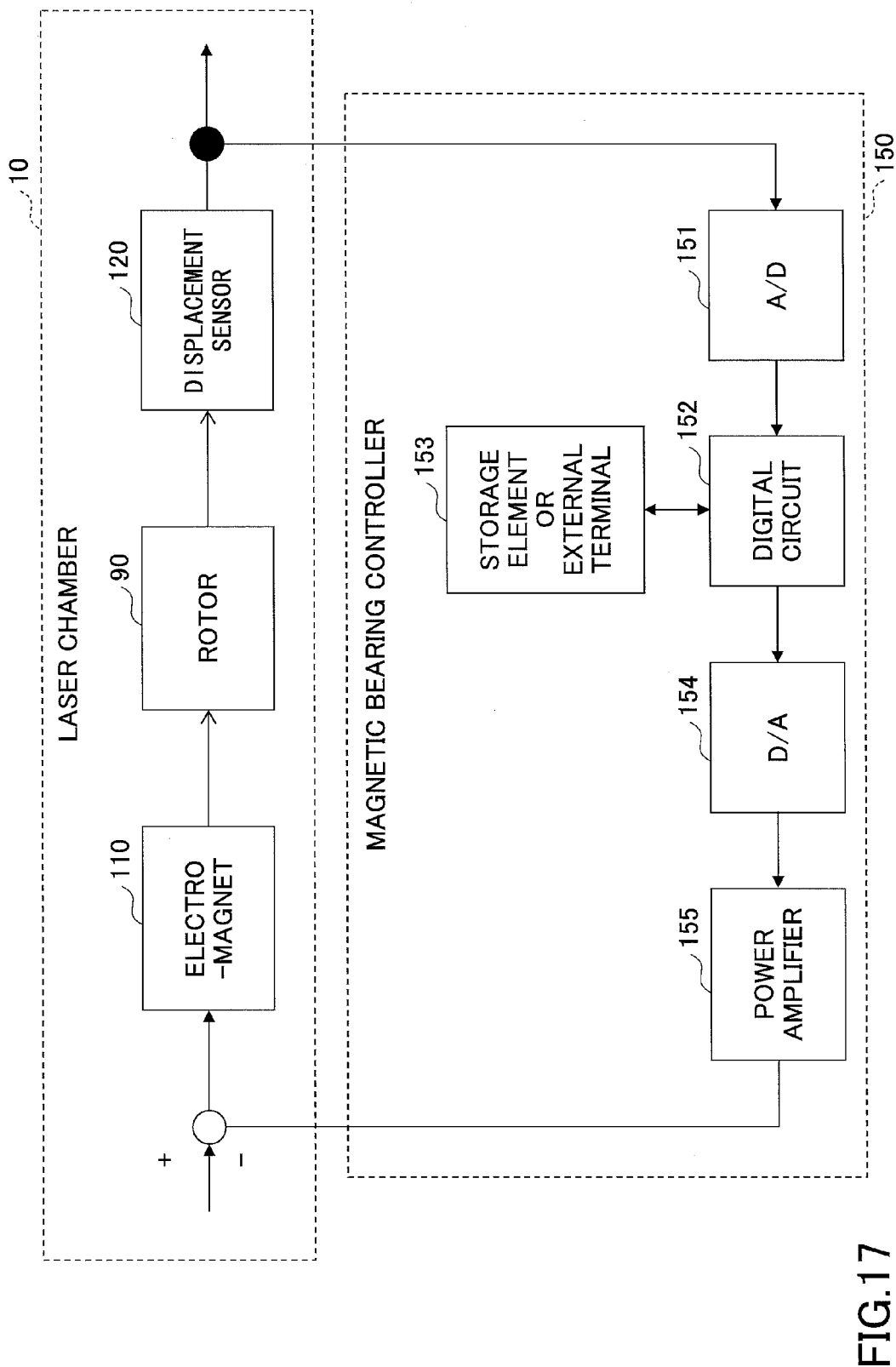
FIG. 17 is a diagram illustrating one example of a magnetic bearing control system of an excimer laser device according to the present embodiment more specifically than FIG. 16.

FIG. 17 is a diagram illustrating one example of a magnetic bearing control system of an excimer laser device according to the present embodiment more specifically than FIG. 16.

In FIG. 17, an electromagnet 110 that is a magnetic floating actuator, a rotor (shaft) 90, and a displacement sensor 120 are provided in a laser chamber 10. Furthermore, an A/D converter 151, a digital circuit 152, a storage element or external terminal 153, a D/A converter 154, and a power amplifier 155 are provided in a magnetic bearing controller 150.

In the laser chamber 10, the rotor (shaft) 90 is a controlled object, the electromagnet 110 is an actuator, and the displacement sensor 120 is a detector. A displacement of the rotor (shaft) 90 that is magnetically floated and driven by the electromagnet 110 is detected by the displacement sensor 120 and an analog value thereof is inputted into the A/D converter 151 of the magnetic bearing controller 150 to be converted into a digital value. Displacement data converted into a digital value are inputted into the digital circuit 152 and an optimal value is calculated in order to provide the rotor (shaft) 90 with a target control value and stored in the storage element 153. Furthermore, a calculated optimal value is inputted into the D/A converter 151, converted into an analogue value, and further, inputted into and amplified by the power amplifier 155. An amplified analog value is subjected to feedback and a feedback control is conducted to control an output from the electromagnet 110 and provide the rotor (shaft) 90 with a target control value.

Herein, preliminarily measured data in a laser factory are stored in the storage element or external terminal 153 and the digital circuit 152 is configured to read these data. Thereby, load on operational processing of the digital circuit 152 can significantly be reduced. Furthermore, the storage element or external terminal 153 may be an external storage medium and acquire data through a network.

6. Calibration of Magnetic Bearings and Acquisition and Setting of Control Parameters 6.1 Calibration of a Magnetic Bearing Sensor FIG. 18 is a diagram for explaining a method for calibrating a displacement sensor for magnetic bearings of an excimer laser device according to the present embodiment.

Figure 18:
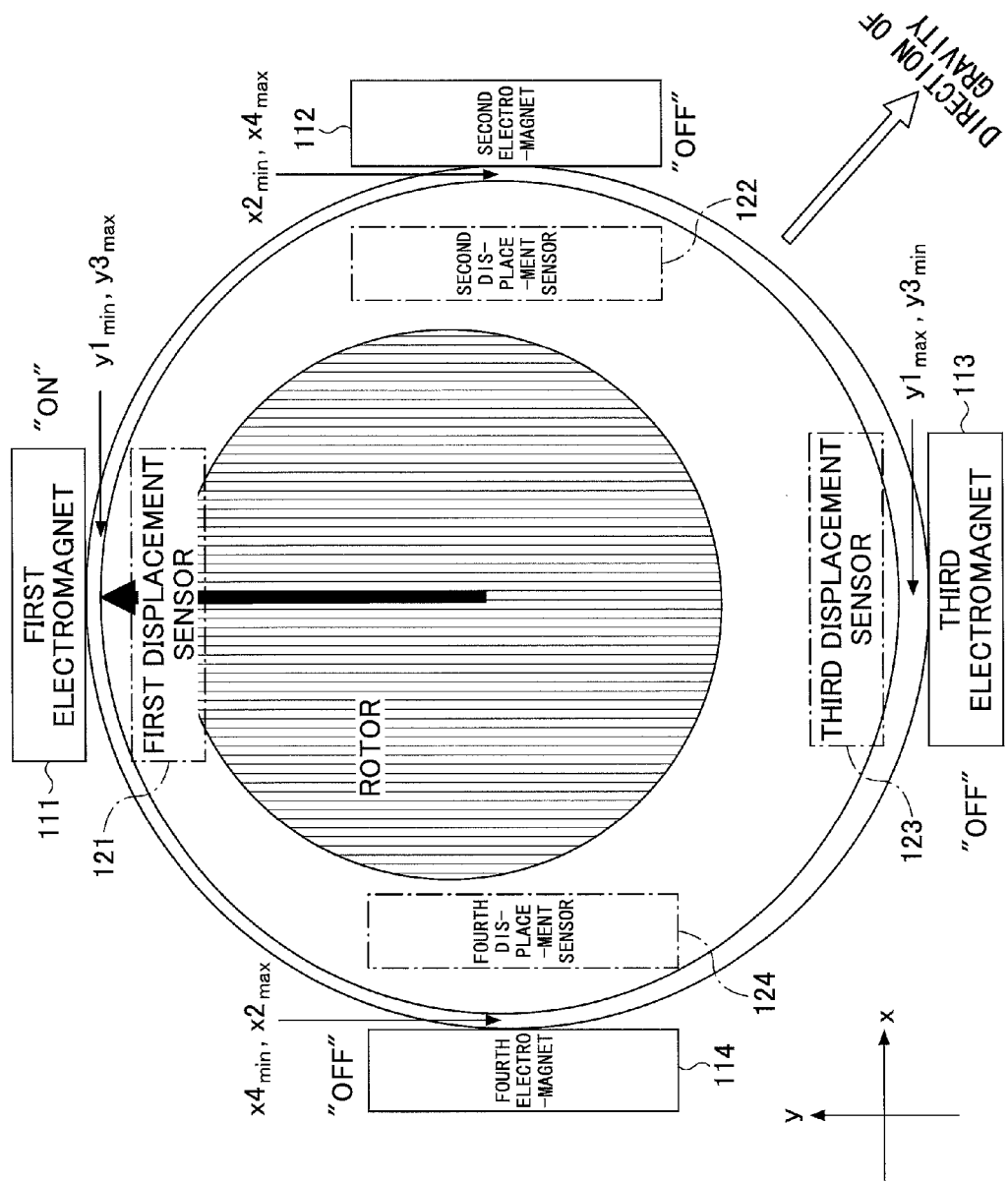
FIG. 18 is a diagram for explaining a method for calibrating displacement sensors for magnetic bearings of an excimer laser according to the present embodiment.

FIG. 18 illustrates a cross-sectional diagram in a radial direction that includes first to fourth displacement sensors 121 to 124 and first to fourth electromagnets 111 to 114 for the magnetic bearings 100 and 101. In FIG. 18, both the first to fourth displacement sensors 121 to 124 and the first to fourth electromagnets 111 to 114 are arranged to oppose in a cross shape centered at an origin on an X-axis and a Y-axis while the origin is a center of a rotor (shaft) 90. In such a configuration, when only the first electromagnet 111 is turned on and the second to fourth electromagnets 112 to 114 are turned off, the rotor (shaft) 90 is floated in a y+ direction, attracted by the first electromagnet 111, and fixed at a position to contact touchdown bearings. The displacement in such a condition is a minimum value $y1_{min}$ for the first displacement sensor 121 and a maximum value $y_{max}$ for the third displacement sensor 123 at an opposite side.

Similarly, when only the third electromagnet 113 is turned on and the first, second, and fourth electromagnets 111, 112, and 114 are turned off, the rotor (shaft) 90 is attracted in a −y direction in which the third electromagnet 113 is present, so that $y3_{min}$ of the third displacement sensor 123 and $y1_{max}$ of the first displacement sensor 121 at a position to contact touchdown bearings are obtained. When a similar process is also conducted in an X-direction, minimum detection values and maximum detection values of all the displacement sensors 121 to 124 are measured. Herein, an actual measurement value ($R_{min}$) at the closest location and an actual measurement value ($R_{max}$) at the furthest location in each direction are preliminarily known from an arrangement relationship between the touchdown bearings and the rotor (shaft) 90, and hence, calibration of all the displacement sensors 111 to 114 can be conducted when calibration of each of the displacement sensors 111 to 114 is conducted in accordance with this configuration.

Figure 19:
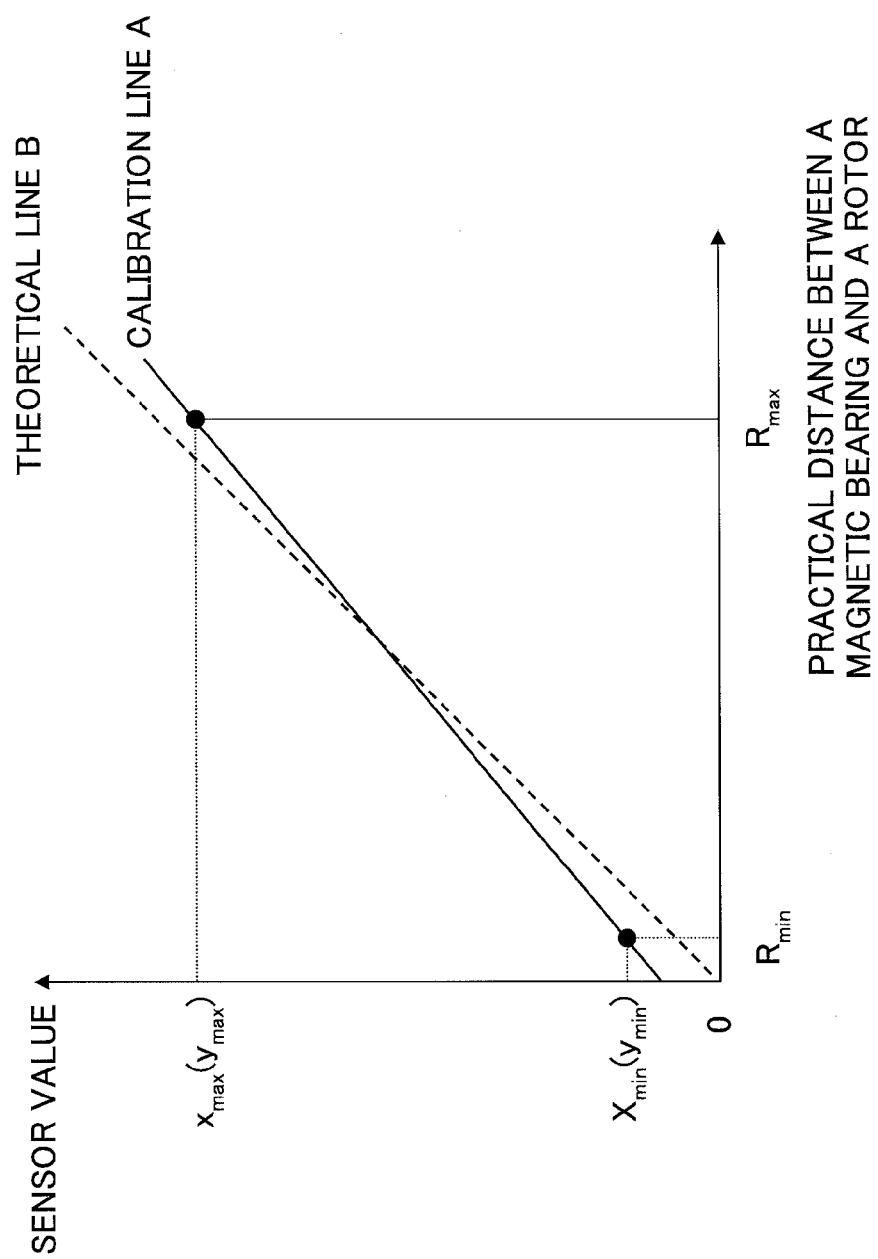
FIG. 19 is a diagram illustrating one example of a relationship between a sensor value and a theoretical value.

FIG. 19 is a diagram illustrating one example of a relationship between a sensor value and a theoretical value. In FIG. 19, a horizontal axis and a vertical axis represent a practical distance between a magnetic bearing and a rotor and a sensor value, respectively. A sensor value that is actually measured by the displacement sensors 121 to 124 and a theoretical value obtained from an actual dimension are represented by a calibration line A and a theoretical line B, respectively. As illustrated in FIG. 18, an actual value is acquired by using a minimum value and a maximum value, and hence, a center position of each of the displacement sensors 121 to 124 can be corrected to be an origin of coordinate, for example, when calibration of a sensor value is conducted by obtaining a line passing through two points at positions of a minimum value and a maximum value of a distance.

For example, calibration of the first to fourth sensors 121 to 124 can thus be conducted.

Figure 20:
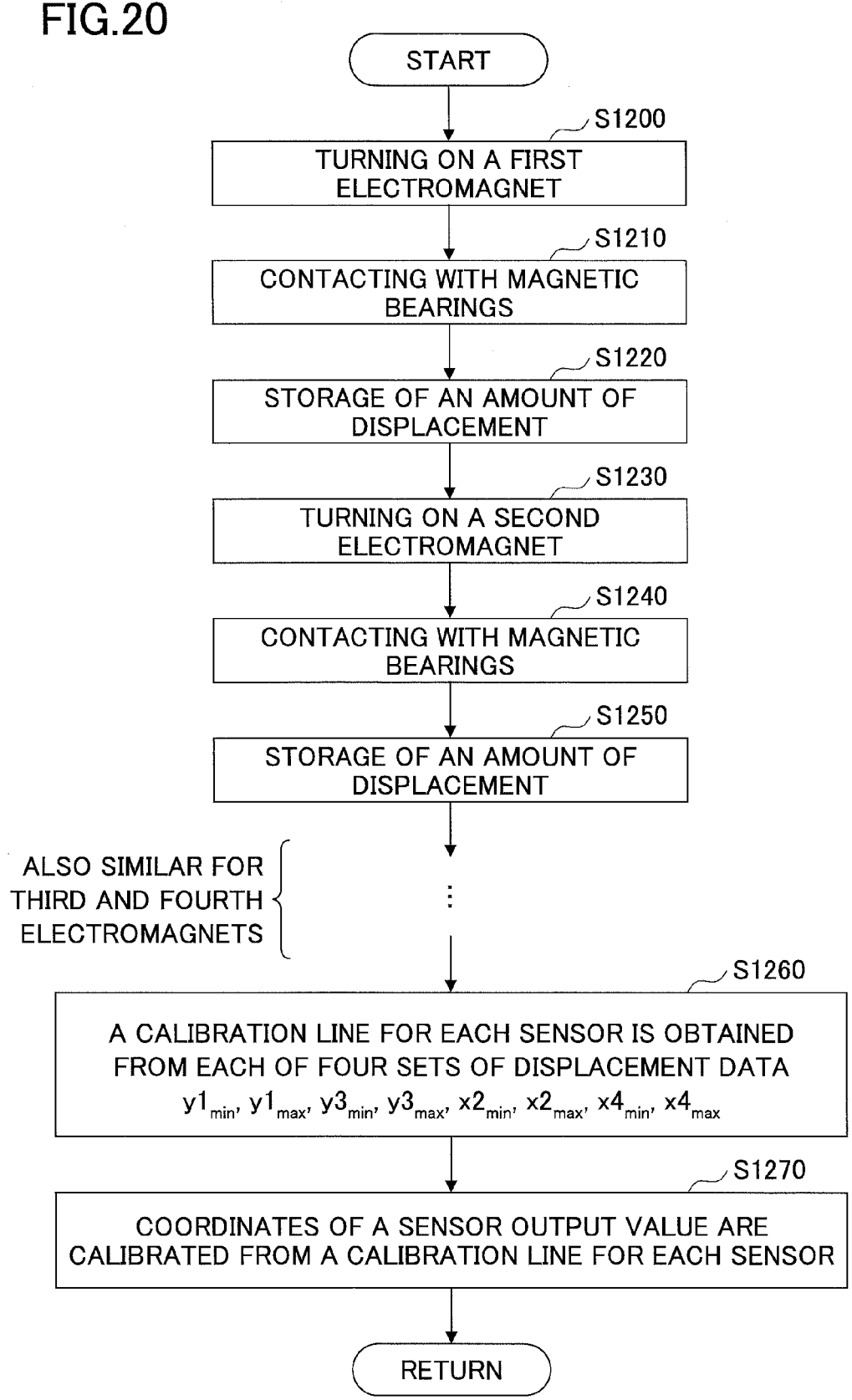
FIG. 20 is a diagram illustrating a processing flow of calibration of a magnetic bearing sensor.

FIG. 20 is a diagram illustrating a processing flow for calibration of a magnetic bearing sensor. Additionally, an identical reference numeral is attached to a component similar to the component described above and a description(s) thereof will be omitted.

At step S1200, only the first electromagnet 111 is turned on and the second to fourth electromagnets 112 to 114 are turned off.

At step S1210, the shaft 90 contacts touchdown bearings for magnetic bearings 100 and 101, and the shaft 90 is fixed at a position closest to the first electromagnet 111.

At step S1220, a displacement amount $y1_{min}$ at which the shaft 90 is closest to the first electromagnet 111 and a displacement amount $y3_{max}$ at which it is furthest from the third electromagnet 113 may be stored. The storage at this time may be conducted on, for example, the storage element or external terminal 153.

At step S1230, only the second electromagnet 112 are turned on and all the first, third, and fourth electromagnets 111, 113, and 114 may be turned off. Thereby, the shaft 90 approaches to the second electromagnet 112 and separates from the fourth electromagnet 114.

At step S1240, the shaft 90 contacts the touchdown bearings and is closest to inner peripheries of the magnetic bearings 100 and 101.

At step S1250, a minimum value $x2_{min}$ of the second displacement sensor 121 and a maximum value $x4_{max}$ of the fourth displacement sensor 124 may be stored.

Then, a similar step may also be conducted for the third electromagnet 113 and the fourth electromagnet 114. Thereby, a minimum value $y3_{min}$ of the third displacement sensor 123, a maximum value $y1_{max}$ of the first displacement sensor 121, a minimum value $x4_{min}$ of the fourth displacement sensor 124, and a maximum value $X2_{max}$ of the second displacement sensor 122 are obtained sequentially.

At step S1260, a calibration line for each sensor may be obtained from each of four sets of displacement data $y1_{min}$, $y1_{max}$, $y3_{min}$, $y1_{max}$, $x2_{min}$, $x2_{max}$, $x4_{min}$, and $x4_{max}$ of the displacement sensors 121 to 124.

At step S1270, a coordinate of an output value of each of the displacement sensors 121 to 124 may be calibrated based on the calibration line for each sensor.

Thus, calibration of each of the displacement sensors 121 to 124 can be conducted by turning on only one of the respective electromagnets 111 to 114 sequentially to apply electric current thereto and generate a magnetic buoyant force.

6.2 Calibration of a Magnetic Bearing Actuator

Figure 21:
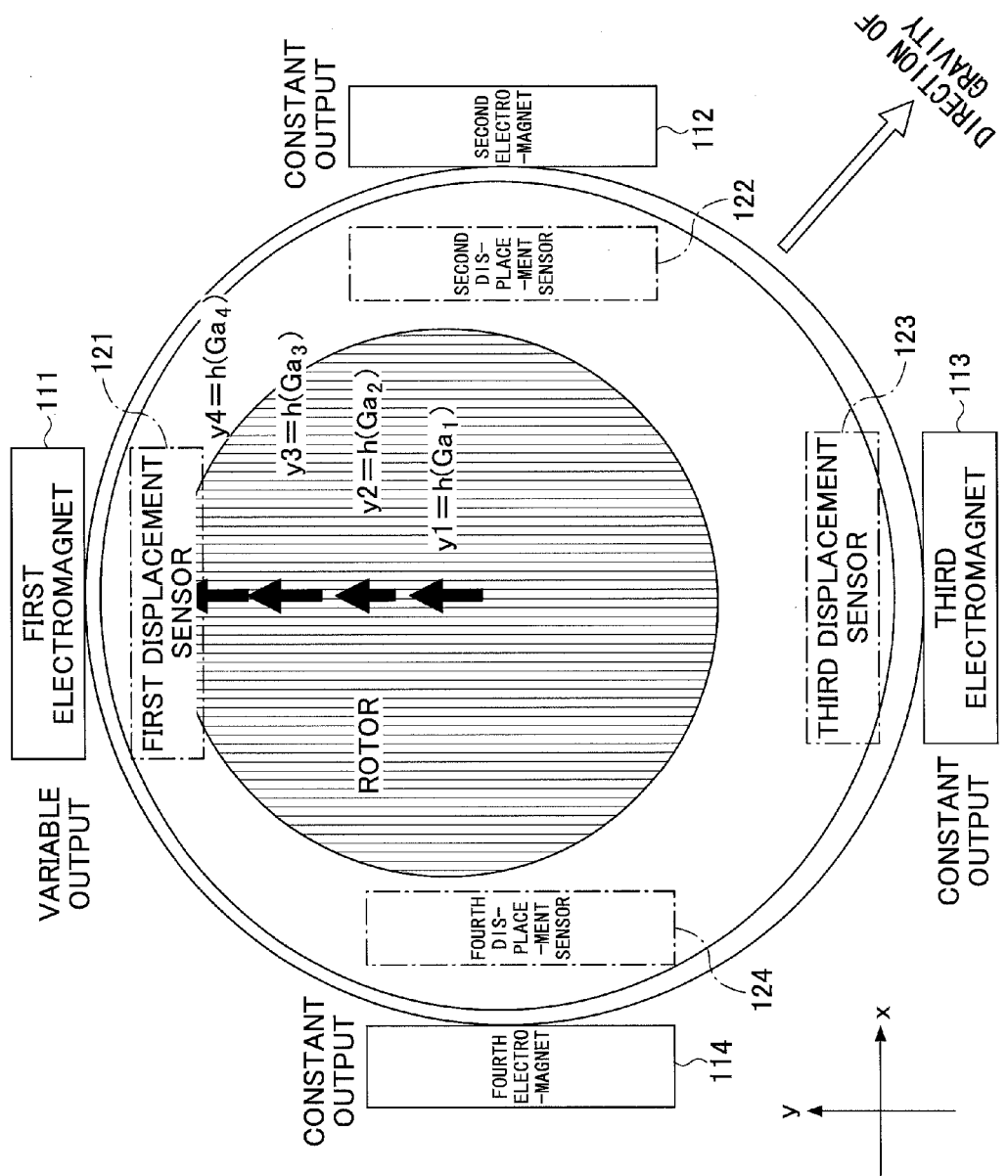
FIG. 21 is a diagram for explaining a method for calibrating a magnetic bearing actuator of an excimer laser device according to the present embodiment.

FIG. 21 is a diagram for explaining a method for calibrating a magnetic bearing actuator of an excimer laser device according to the present embodiment.

As illustrated in FIG. 21, first, the rotor (shaft) 90 is set at a geometrical center as an initial position in a method for calibrating an actuator. That is, a center of the rotor (shaft) 90 is adjusted to coincide with a position of an origin of a coordinate system. This condition is a condition that magnetic forces from the first to fourth electromagnets 111 to 114 are balanced and outputted in such a manner that the rotor (shaft) 90 coincides with an origin of a coordinate system.

Then, the magnitude of electric current passing through the first electromagnet is changed by a plurality of steps to detect a displacement amount of the first displacement sensor 121 on the condition that outputs of the second to fourth electromagnets 112 to 114 are constant. For example, as illustrated in FIG. 21, while the magnetic force of the electromagnet is changed by four steps of $Ga_1$, $Ga_2$, $Ga_3$, and $Ga_4$, each of displacement amounts $y1=h(Ga_1)$, $y2=h(Ga_2)$, $y3=h(Ga_3)$, and $y4=h(Ga_4)$ is measured and y1, y2, y3, and y4 are stored together with $Ga_1$, $Ga_2$, $Ga_3$, and $Ga_4$. Here, $y=h(s)$ is a function representing a displacement amount for an actuator output s.

Such a measurement is also conducted for the second to fourth electromagnets 112 to 114 and a relationship between an actuator output and a displacement amount is obtained for all the electromagnets 111 to 114.

Figure 22:
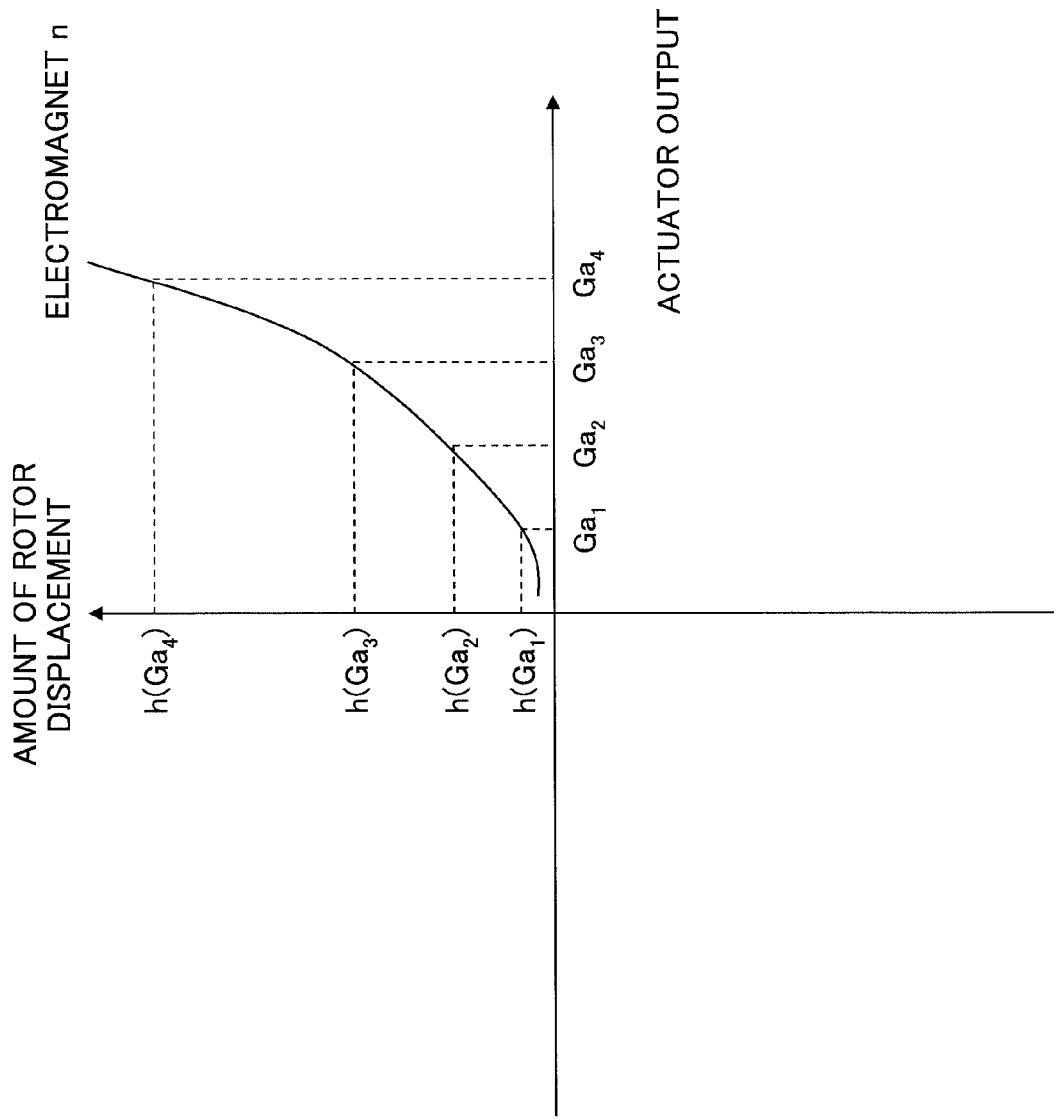
FIG. 22 is a diagram illustrating a relationship between a measured actuator output and an amount of displacement of a rotor.

FIG. 22 is a diagram illustrating a relationship between a measured output of an actuator (electromagnets 111 to 114) and a displacement amount of a rotor. A relationship between each actuator driving value and an actual displacement amount of the rotor (shaft) 90 can be obtained by acquiring such data.

Figure 23:
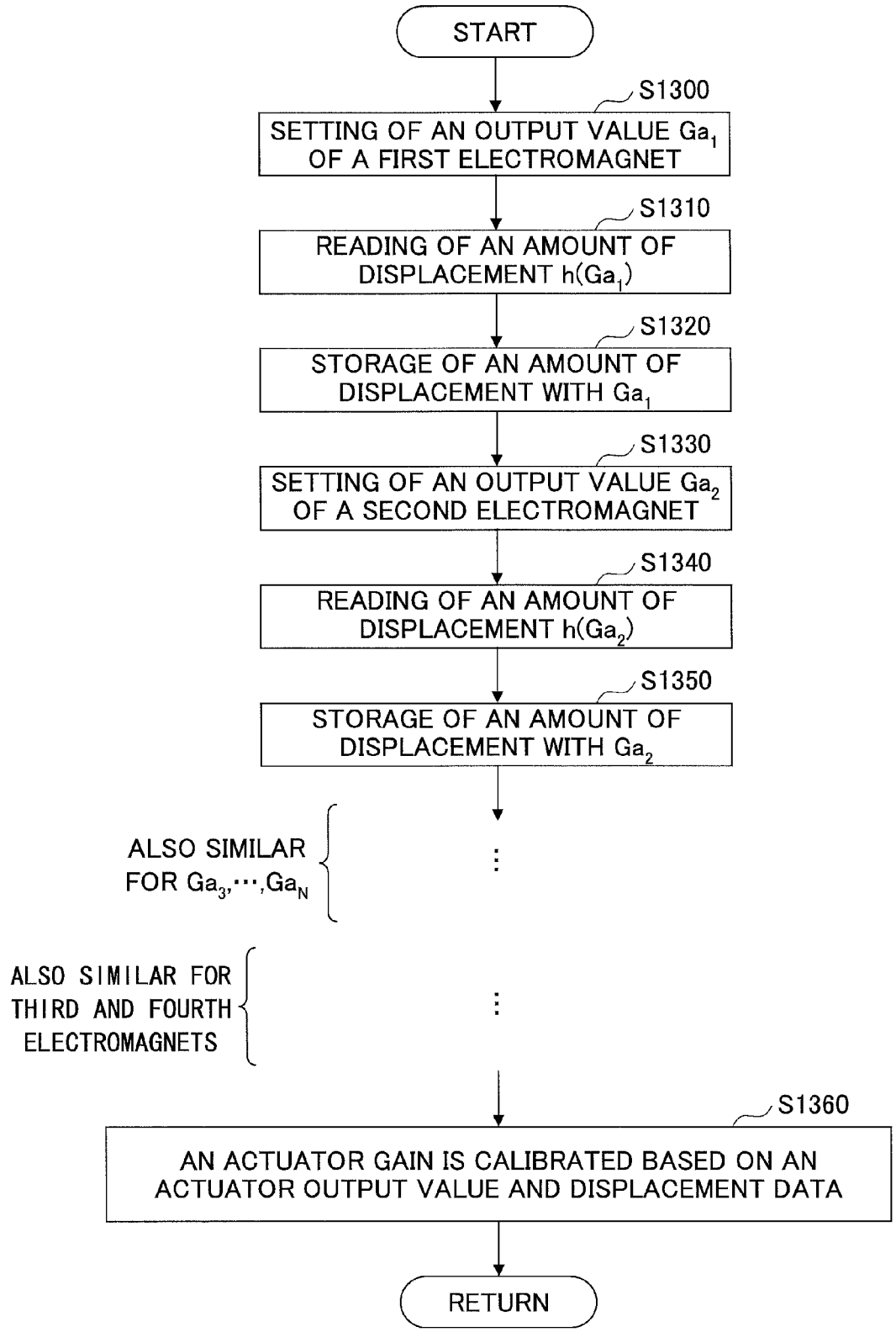
FIG. 23 is a processing flow diagram illustrating one example of calibration of a magnetic bearing actuator.

FIG. 23 is a processing flow diagram illustrating one example of calibration of a magnetic bearing actuator in an excimer laser device according to the present embodiment.

At step S1300, after the rotor (shaft) 90 is positioned at the center of the coordinate system, an output value $Ga_1$ of the first electromagnet is set. Herein, outputs of the second to fourth electromagnets 112 to 114 are constant.

At step S1310, reading of displacement amount $y1=h(Ga_1)$ is conducted.

At step S1320, the displacement amount y1 is stored together with the output value $Ga_1$.

At step S1330, an output value $Ga_2$ of the first magnet 111 is set. Also in this case, output values of the other or second to fourth electromagnets 112 to 114 are constant so that first set output values are held.

At step S1340, reading of $y2=h(Ga_2)$ is conducted. At step S1350, the displacement amount y2 is stored together with $Ga_2$. Then, steps similar to steps S1300 to S1350 are executed for $Ga_3, \ldots, Ga_N$, and a relationship of output values versus displacement amounts is obtained for the first electromagnet 111. Furthermore, a processing flow of steps S1300 to S1350 is also repeated for the second to fourth electromagnets 112 to 114 so that a relationship between output values and displacement amounts is obtained for all the electromagnets.

At step S1360, an actuator gain is calibrated from actuator output values and displacement data.

Thus, according to an excimer laser device according to the present embodiment, an actuator gain can be calibrated by first adjusting an output value of each actuator in such a manner that a rotor (shaft) is arranged at a center position and subsequently changing an output value of only one actuator so that displacement data are acquired sequentially.

Figure 24:
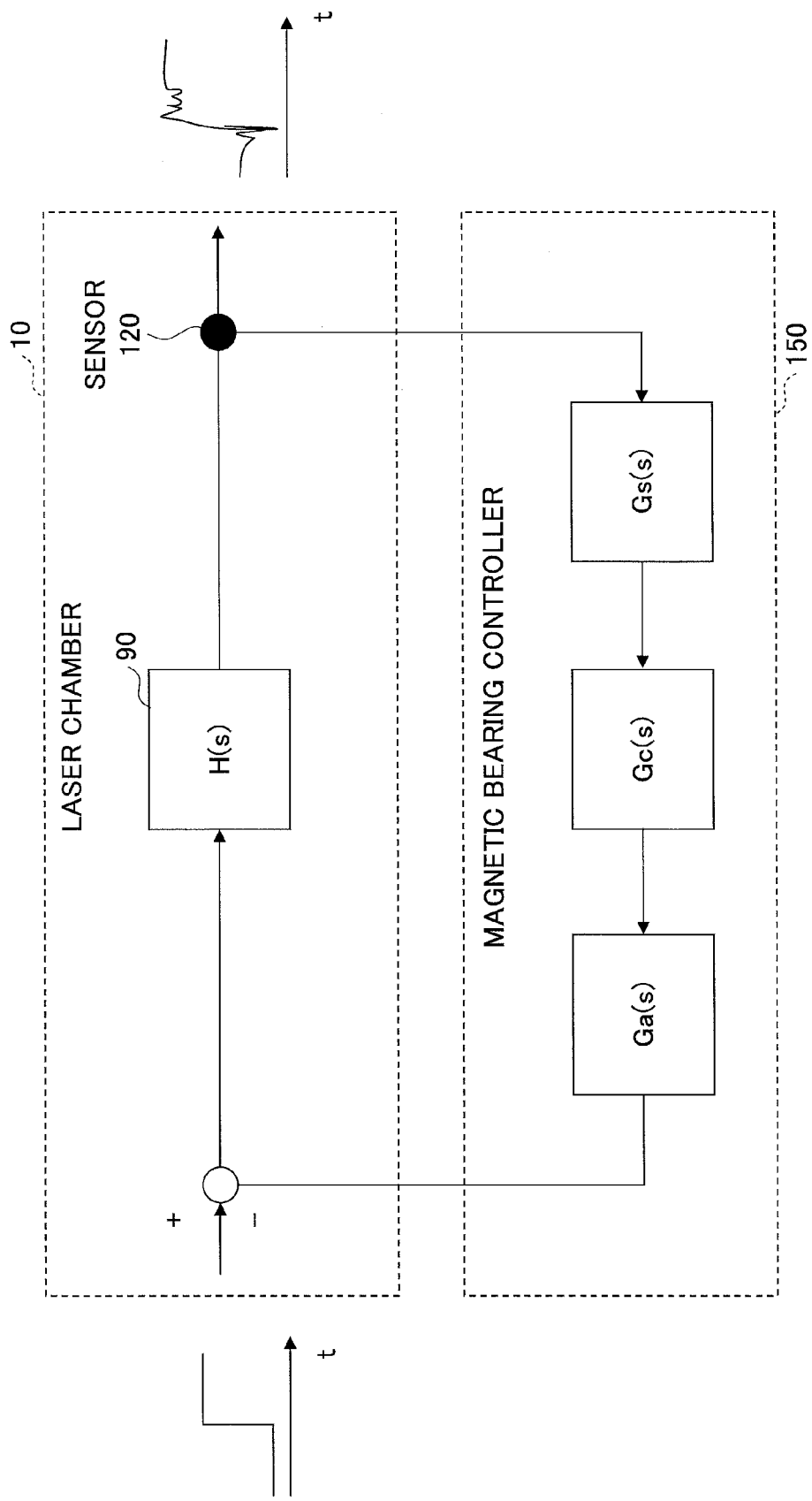
FIG. 24 is a block diagram illustrating one example of a magnetic bearing control system of an excimer laser device according to the present embodiment.

6.3 Acquisition and Setting of Control Parameters for Magnetic Bearings 6.3.1 Acquisition and Setting of Control Gains for Magnetic Bearings FIG. 24 is a block diagram illustrating one example of a magnetic bearing control system of an excimer laser device according to the present embodiment.

In FIG. 24, a laser chamber 10 that may include a laser chamber actuator (electromagnet) 110 and a displacement sensor 120 is provided at an upper side. A magnetic bearing controller 150 is illustrated at a lower side. In the figure, Gs(s) is a sensor driving frequency response function, Gc(s) is a control system frequency response actuator, Ga(s) is an actuator driving frequency response function, and H(s) is a chamber (rotor) frequency response function.

As illustrated in FIG. 24, a control gain is determined in such a manner that a frequency component is extracted from displacement sensor data of a stepwise response in the case where a stepwise function is inputted into an electromagnet 110, so that a floating position is stable. This is conducted to address a long period of use, a long period of no use, or an environmental change. Although, in this embodiment, a frequency component is extracted from displacement sensor data of a stepwise response in the case where a stepwise function is inputted, limitation to this example is not provided and a frequency component may be extracted from sensor data that are response to inputting of a predetermined function.

Figure 25:
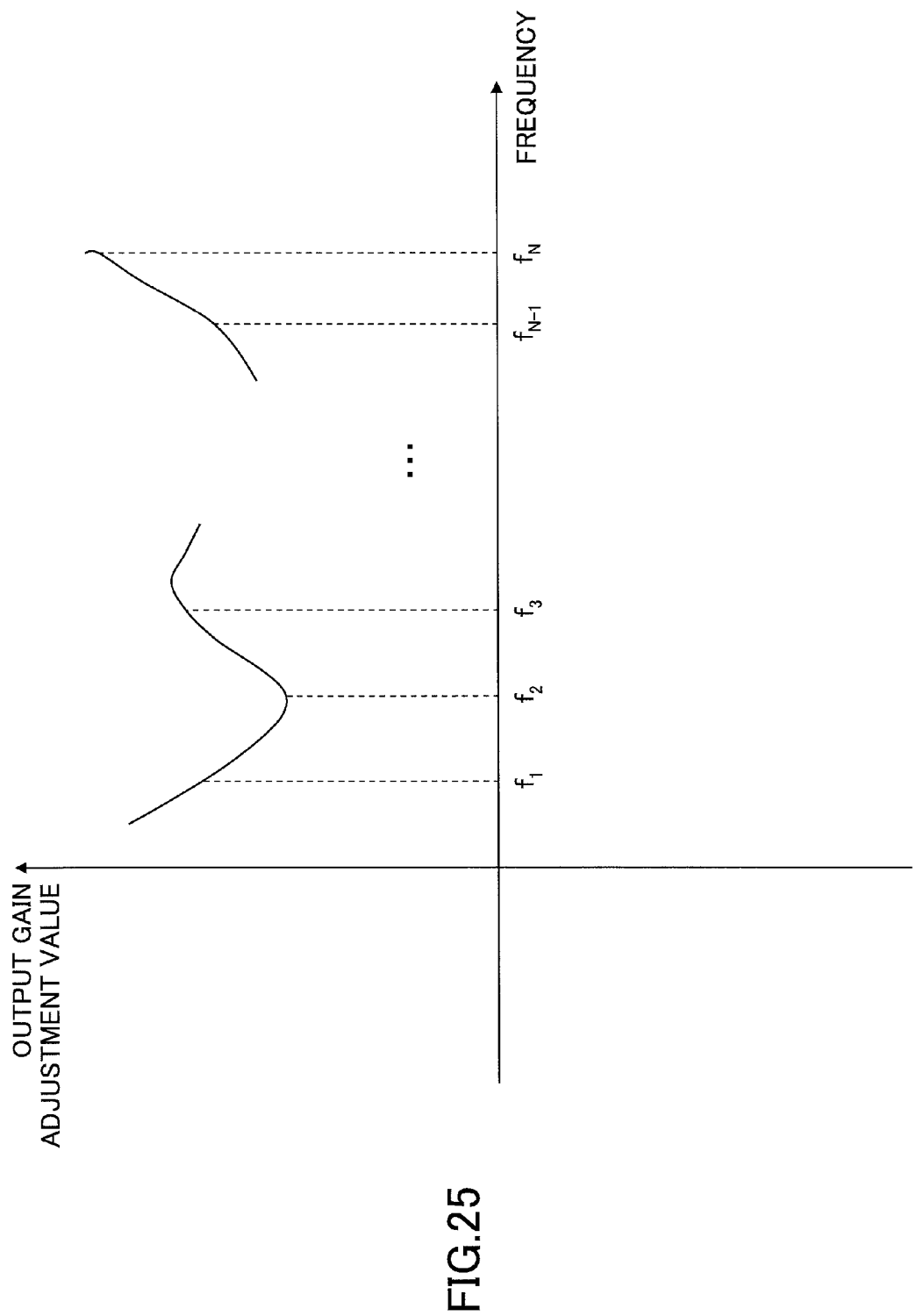
FIG. 25 is a diagram illustrating a relationship between a frequency component of a stepwise response to an input of a stepwise function and an output gain adjustment value.

FIG. 25 is a diagram illustrating a relationship between a frequency component of a stepwise response to inputting of a stepwise function obtained as illustrated in FIG. 24 and an output gain adjustment value. In FIG. 25, a horizontal axis and a vertical axis represent a frequency and an output gain adjustment value, respectively. As illustrated in FIG. 25, a frequency component analysis is conducted on a response of a displacement sensor and an amount of gain to provide a stable floating position is determined therefrom.

Figure 26:
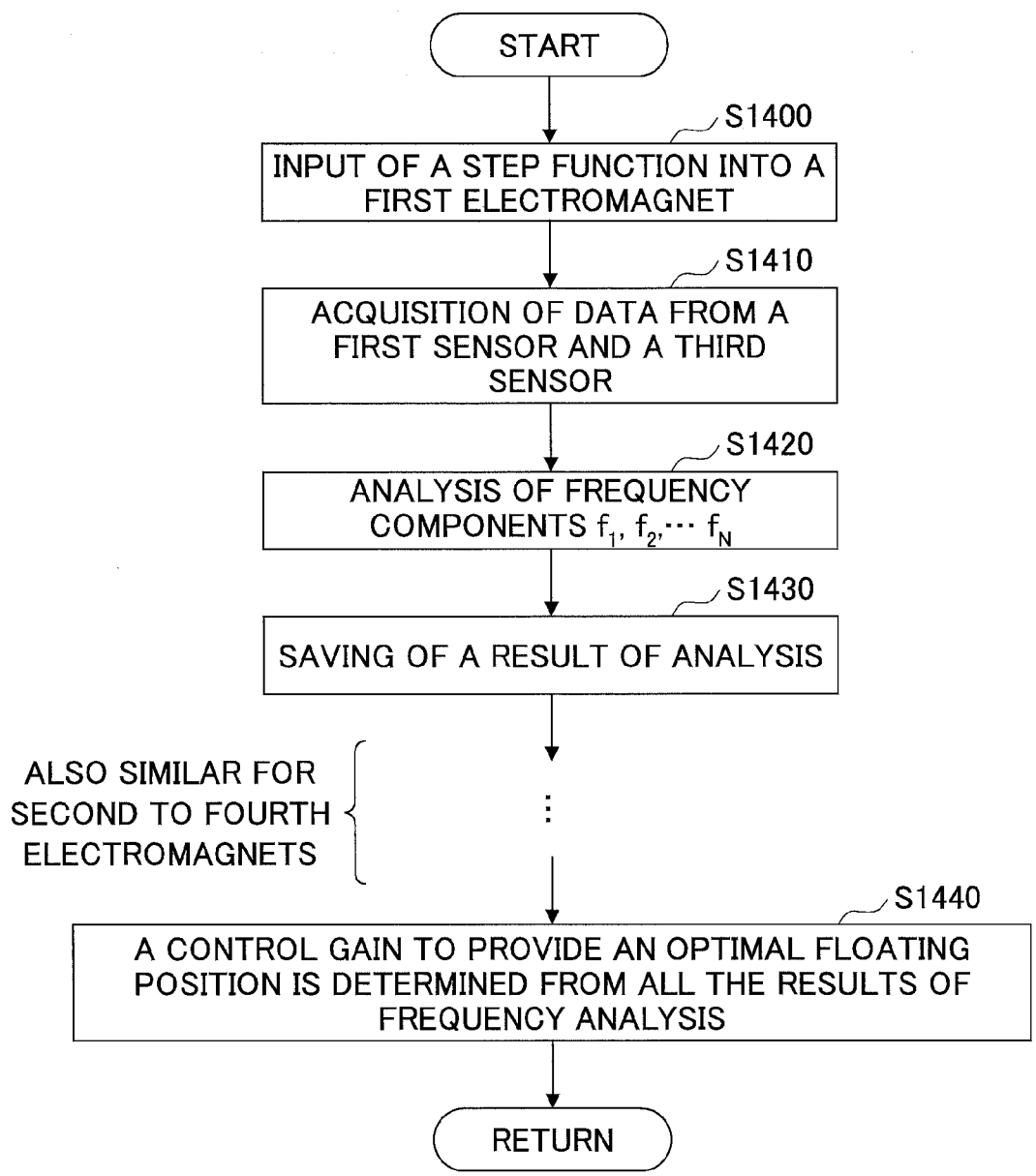
FIG. 26 is a diagram illustrating a processing flow of a method for acquiring and setting a control gain for magnetic bearings.

FIG. 26 is a diagram illustrating a processing flow of a method for acquiring and setting control gains for magnetic bearings in an excimer laser device according to the present embodiment.

At step S1400, a stepwise function is inputted into the first electromagnet 111 and a stepwise response is outputted.

At step S1410, data of a stepwise response in an X-direction are acquired from the first displacement sensor 121 and the third displacement sensor 123 opposing thereto.

At step S1420, frequency components $f1, f2, \ldots, fn$ of a stepwise response are analyzed.

At step S1430, the results of frequency component analysis of a stepwise response are stored and saved. Then, a processing flow of steps S1400 to S1430 is repeated for second to fourth electromagnets 112 to 114, and data of the results of frequency component analysis of a stepwise response of the first to fourth electromagnets 111 to 114 are saved.

At step S1440, control gains are determined from all the date of the results of frequency component analysis in such a manner that the rotor (shaft) 90 is at an optimal floating position.

Thus, optimal control gains can be calculated by inputting a stepwise function to each of the electromagnets 111 to 114 individually and analyzing a frequency component of the stepwise response.

6.3.2 Acquisition and Setting of a Center-of-Inertia Control Parameter

Figure 27:
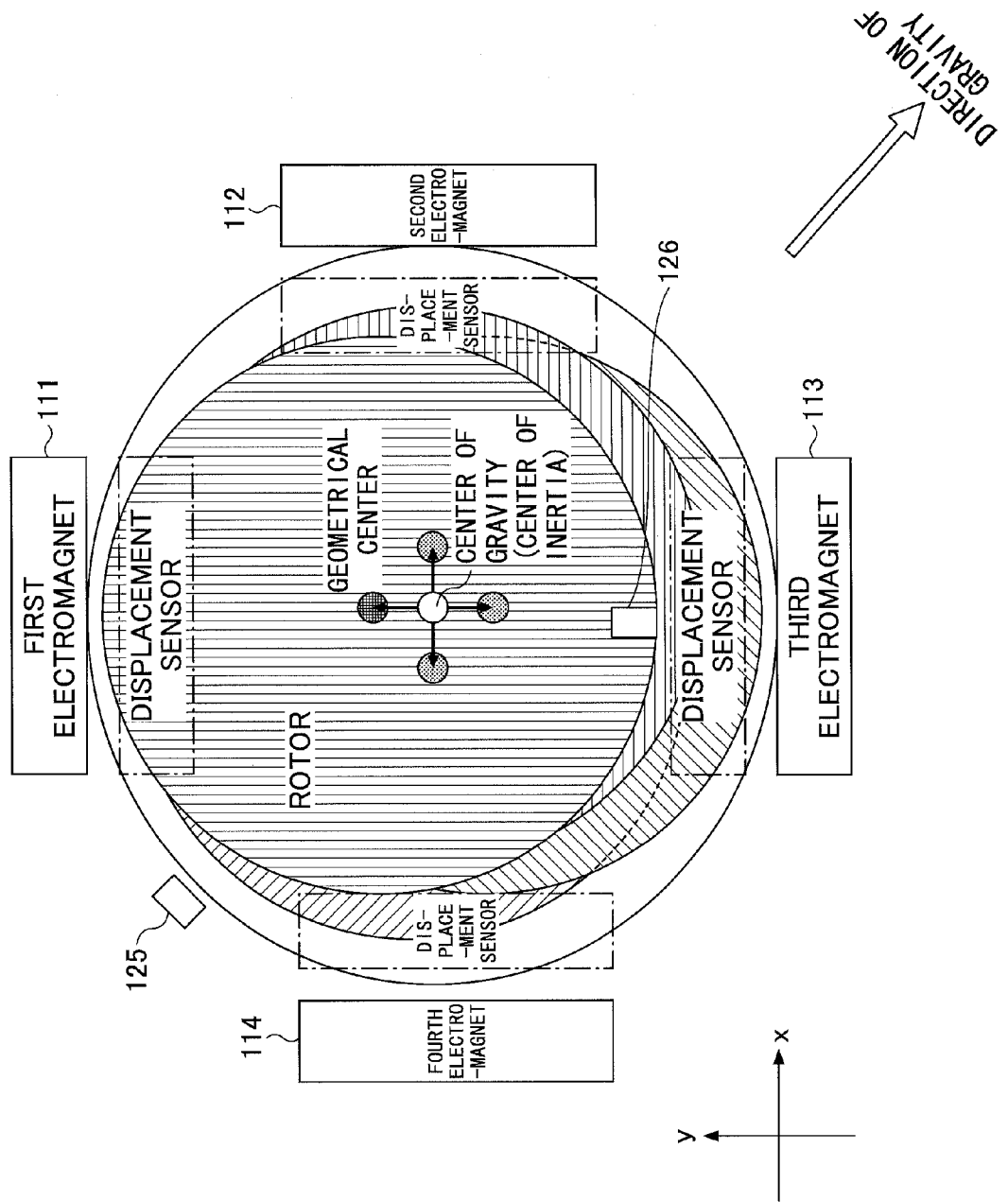
FIG. 27 is a diagram for explaining acquisition and setting of a control parameter of a center-of-inertia control.

FIG. 27 is a diagram for explaining acquisition and setting of control parameters of a center-of-inertia control in an excimer laser device according to the present embodiment.

FIG. 27 illustrates a cross section in a radial direction that includes the first to fourth electromagnets 111 to 114 and the first to fourth displacement sensors 121 to 124. FIG. 27 is different from the cross-sectional diagrams in the embodiment described above in that a rotational position detection sensor 125 at a side of a stator and a rotational position detection sensor 126 at a side of the rotor (shaft) 90 are provided at a side of magnetic bearings 100 and 101 and a side of the rotor (shaft) 90, respectively, as well as the first to fourth electromagnets 111 to 114 and the first to fourth displacement sensors 121 to 124.

A center-of-inertia control means a control that does not rotate a rotor with a geometrical center position as a rotational axis but rotate a rotor with a center of gravity (center of inertia) thereof as a rotational axis. Hence, when a center of gravity of a rotor (the cross flow fan 80 and the shaft 90, that may be referred to as "rotor 80, 90" hereinafter) is displaced from a geometrical center, the rotor 80, 90 is rotated while a center of gravity thereof is a rotational axis. Thereby, rotation of the rotor 80, 90 is constantly conducted smoothly and vibration can be suppressed even at the time of high speed rotation.

In order to conduct such a center-of-inertia control, a position of a center of gravity of the rotor 80, 90 is first detected. For detection of a position of a center of gravity, the rotor 80, 90 is first controlled to rotate at a geometrical center with respect to both the magnetic bearing 100 at a side of the motor 140 and the magnetic bearing 101 at an opposite side of the motor 140, so that optimal setting values for the electromagnets 111 to 114 are stored together with information of rotational positions.

Then, a process is conducted in such a manner that a center of inertia is obtained from a distribution of setting values of the electromagnets 111 to 114 with respect to a phase and the rotor 80, 90 is rotated around a center of inertia while an amount of offset is adjusted depending on a phase of rotation.

Figure 28A:
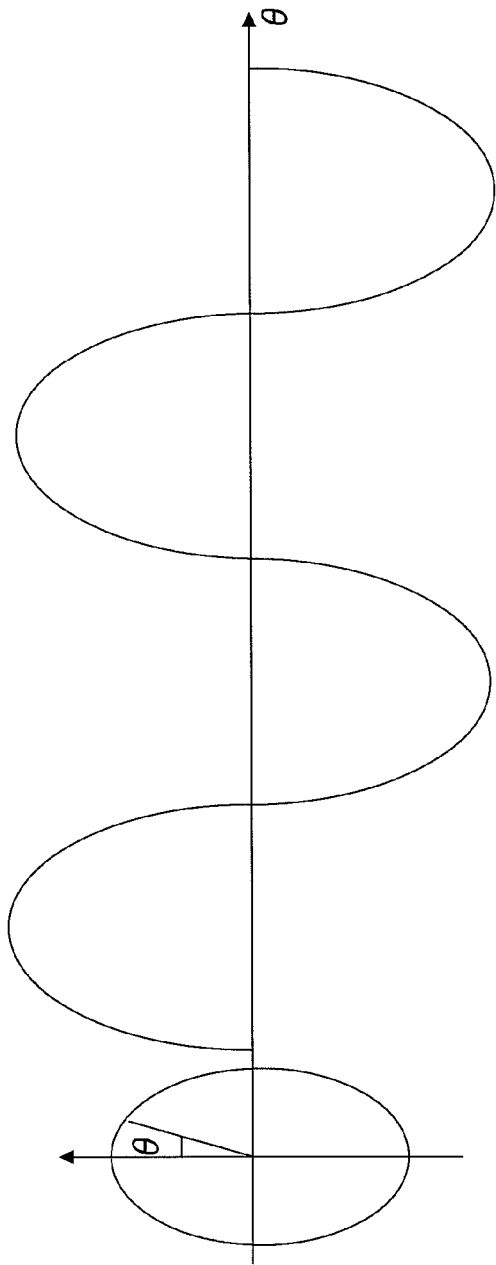
FIG. 28A and FIG. 28B are diagrams illustrating one example of a rotational position of a rotor and a setting value of an electromagnet n in the case where the rotor is rotated around a geometrical center.
Figure 28B:
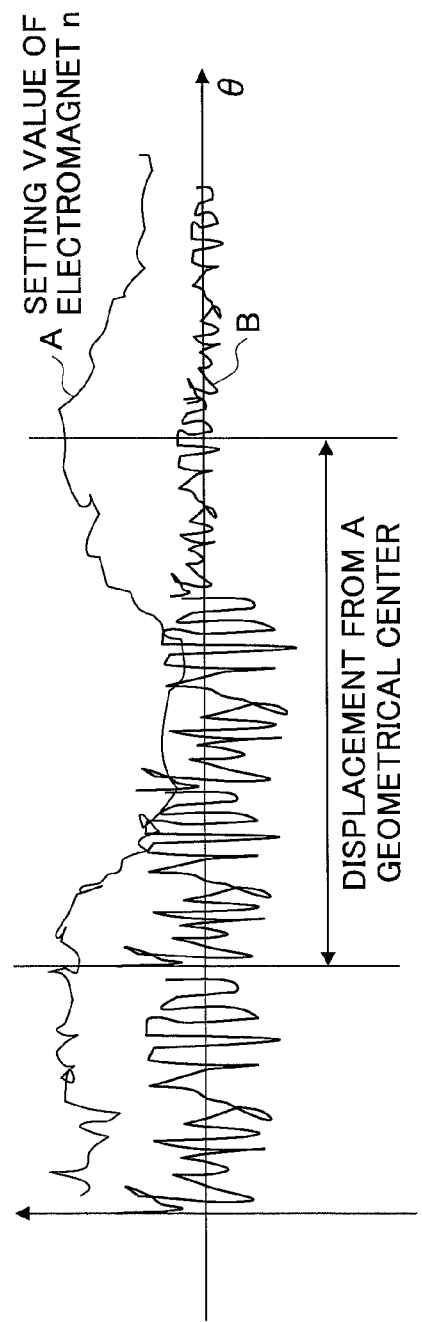

FIG. 28A and FIG. 28B are diagrams illustrating one example of a rotational position (phase) of a rotor and a setting value of an electromagnet n in the case where the rotor (shaft) 90 is rotated at a geometrical center. FIG. 28A illustrates a rotational position (phase) of the rotor and FIG. 28B is a diagram illustrating a setting value of the electromagnet n and a displacement from a geometrical center.

A setting value of the electromagnet n changes as a characteristic line A based on a phase change illustrated in FIG. 28A. Furthermore, similarly, a displacement from a geometrical center changes as a characteristic line B based on a phase change illustrated in FIG. 28A.

That is, when a center of inertia (center of gravity) of the rotor 80, 90 is different from the geometrical center thereof and if the rotor is forcedly rotated around a geometrical center, the rotor 80, 90 is subjected to a centrifugal force to displace from the geometrical center. Herein, the rotor 80, 90 is rotated more than once and comparison is made with a previous setting value of an electromagnet at an identical phase, so that a phase and a setting value are obtained in such a manner that stable rotation is attained near a geometrical center in the case where the rotor 80, 90 is rotated around a geometrical center as a rotational axis. Thereby, an optimal setting value at each phase in the case of rotation around a geometrical center, namely, a control model in the case of rotation around a geometrical center is obtained.

As illustrated in FIG. 28B, a setting value of the electromagnet n indicated by the characteristic line A and a displacement from a geometrical center indicated by the characteristic line B are obtained, and the above-mentioned control model can be obtained by calculating a setting value of the electromagnet n at each phase controlled in such a manner that such a displacement is minimized.

FIG. 29A and FIG. 29B are diagrams illustrating one example of a method for calculating a center of inertia in an excimer laser device according to the present embodiment. FIG. 29A is a diagram illustrating the rotational position (phase) of a rotor and FIG. 29B is a diagram illustrating one example of a calculated value of an electromagnet n at each phase illustrated in FIG. 29A.

A center of inertia (center of gravity) may be calculated from information of an optimal setting value at each phase in the case where a rotor is rotated around a geometrical center as illustrated in FIG. 28A and FIG. 28B. Then, a control may be such that a value of offset of such a center of inertia is reflected onto an output of the electromagnets 111 to 114 and the rotor 80, 90 is rotated at a center of inertia.

Figure 30:
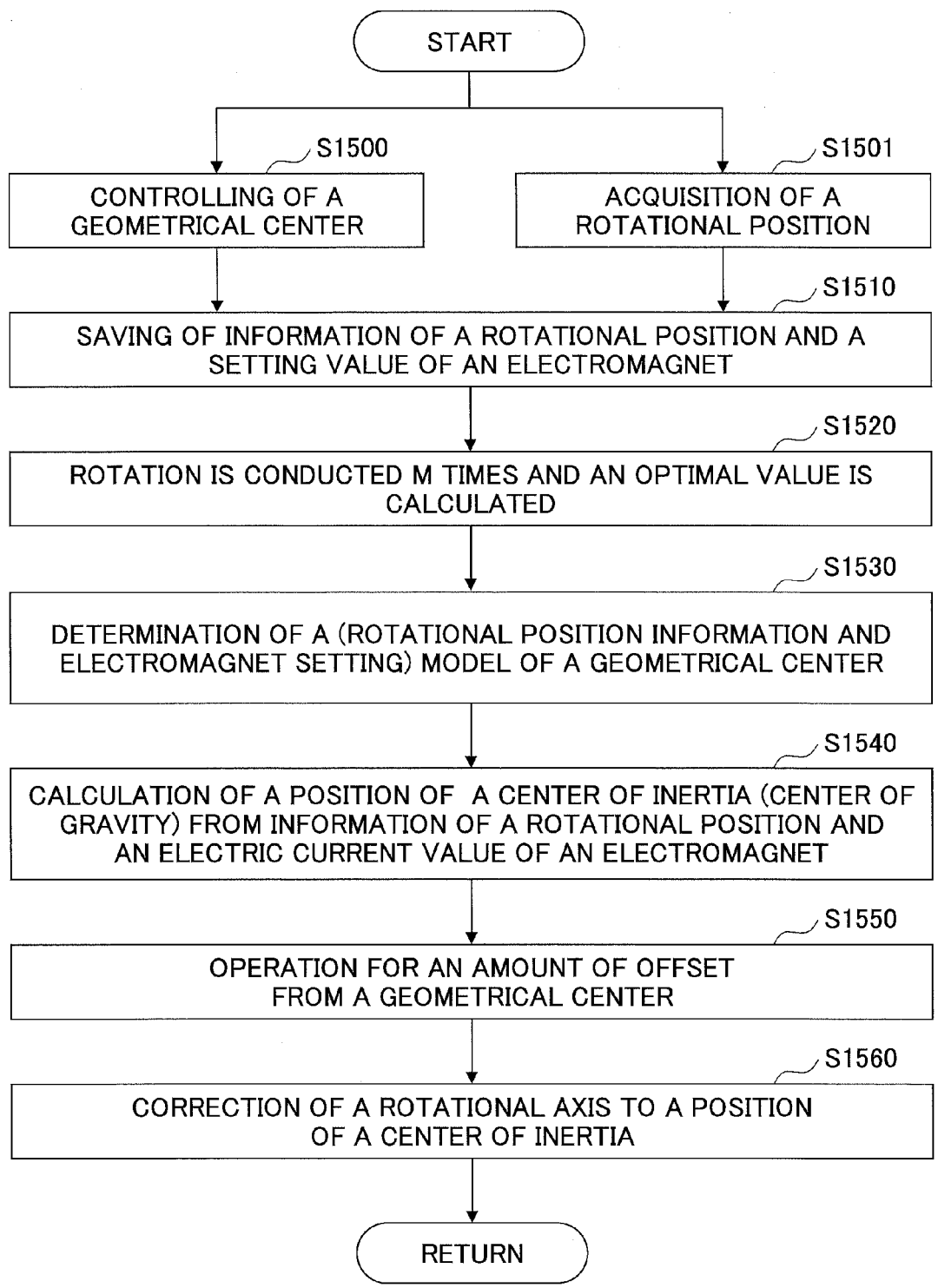
FIG. 30 is a diagram illustrating one example of a processing flow of a method for acquiring and setting a control parameter of a center-of-inertia control in an excimer laser device according to the present embodiment.

FIG. 30 is a diagram illustrating one example of a processing flow of acquisition and setting of control parameters for a center-of-inertia control in an excimer laser device according to the present embodiment.

At step S1500, a geometrical center control is conduced to rotate the rotor 80, 90 around a geometrical center as a rotational axis.

On the other hand, at step S1501, acquisition of information of a rotational position is conducted parallel to step S1500. That is, while the rotor 80, 90 is rotated in accordance with the geometrical center control, such information of a rotational position is acquired.

At step S1510, information of a rotational position and a setting value of an electromagnet are saved during the geometrical center control.

At step S1520, rotation is made M times and an optimal value of setting of an electromagnet is calculated at each rotational position in the geometrical center control.

At step S1530, a control model indicating an optimal setting of an electromagnet at information of each rotational position in the geometrical center control is determined from calculated results.

At step S1540, a position of a center of inertia (center of gravity) is calculated from information of a rotational position and values of electric current through the electromagnets 111 to 114.

At step S1550, operational processing is conducted for calculating an amount of offset from a geometrical center to a center of inertia.

At step S1560, a rotational axis of the rotor 80, 90 is corrected from a geometrical center to a position of a center of inertia and rotational driving is conducted by the geometrical center control.

Figure 31:
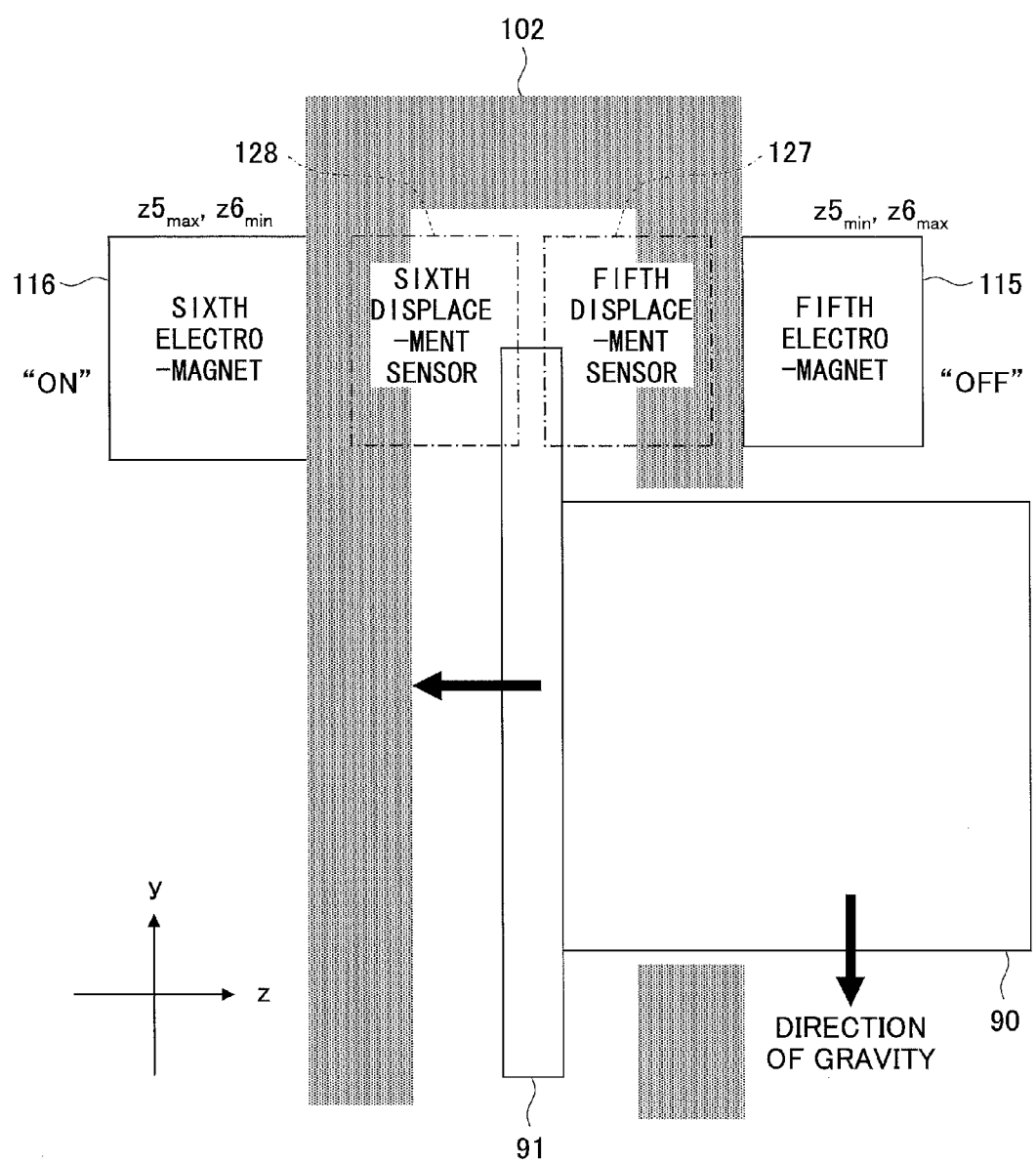
FIG. 31 is a diagram illustrating one example of a cross-sectional configuration of a magnetic bearing in an axial direction thereof.

7. Others 7.1 Calibration of a Displacement Sensor and Calibration of an Actuator in an Axial Direction Thereof FIG. 31 is a diagram, illustrating one example of a cross-sectional configuration of a magnetic bearing in an axial direction thereof. In the above, the embodiment for calibrating a displacement sensor and an actuator in a radial direction has been described. Similarly, calibration of a displacement sensor and an actuator in an axial direction can also be conducted similarly. The matter will be described below.

In FIG. 31, a magnetic bearing 102 in an axial direction is provided with a shaft 90, a disk 91, a fifth electromagnet 115, a sixth electromagnet 116, a fifth displacement sensor 127, and a sixth displacement sensor 128 in an axial direction. The shaft 90 includes a disc-like disk 91 at an end portion thereof. The fifth displacement sensor 127 and the sixth displacement sensor 128 are arranged at both ends to interpose the disk 91 in an axial direction. Furthermore, the fifth electromagnet 115 and the sixth electromagnet 116 are arranged outside the fifth displacement sensor 127 and the sixth displacement sensor 128, respectively, in an axial direction. For example, when only the sixth electromagnet 116 is turned on and the fifth electromagnet 115 is turned off, the disk 91 is attracted and moves toward the sixth electromagnet 116. Such movement can be detected by each of the fifth and sixth displacement sensors 127 and 128 and a position of the disk 91 in an axial direction can be detected from each value.

For a method of calibration, first, the fifth electromagnet 115 is turned off, the sixth electromagnet 116 is turned on, and the disk 91 is moved to be closest to the magnetic bearing 102. Then, a displacement amount of a sensor is stored at that time.

Then, a similar operation is also conducted in a direction of an opposite side and calibration of the fifth and sixth displacement sensors 127 and 128 is conducted by correcting a relationship between the sensors and a coordinate system based on all the data of a displacement amount (for example, $Z_{max}$ and $Z_{min}$).

Figure 32:
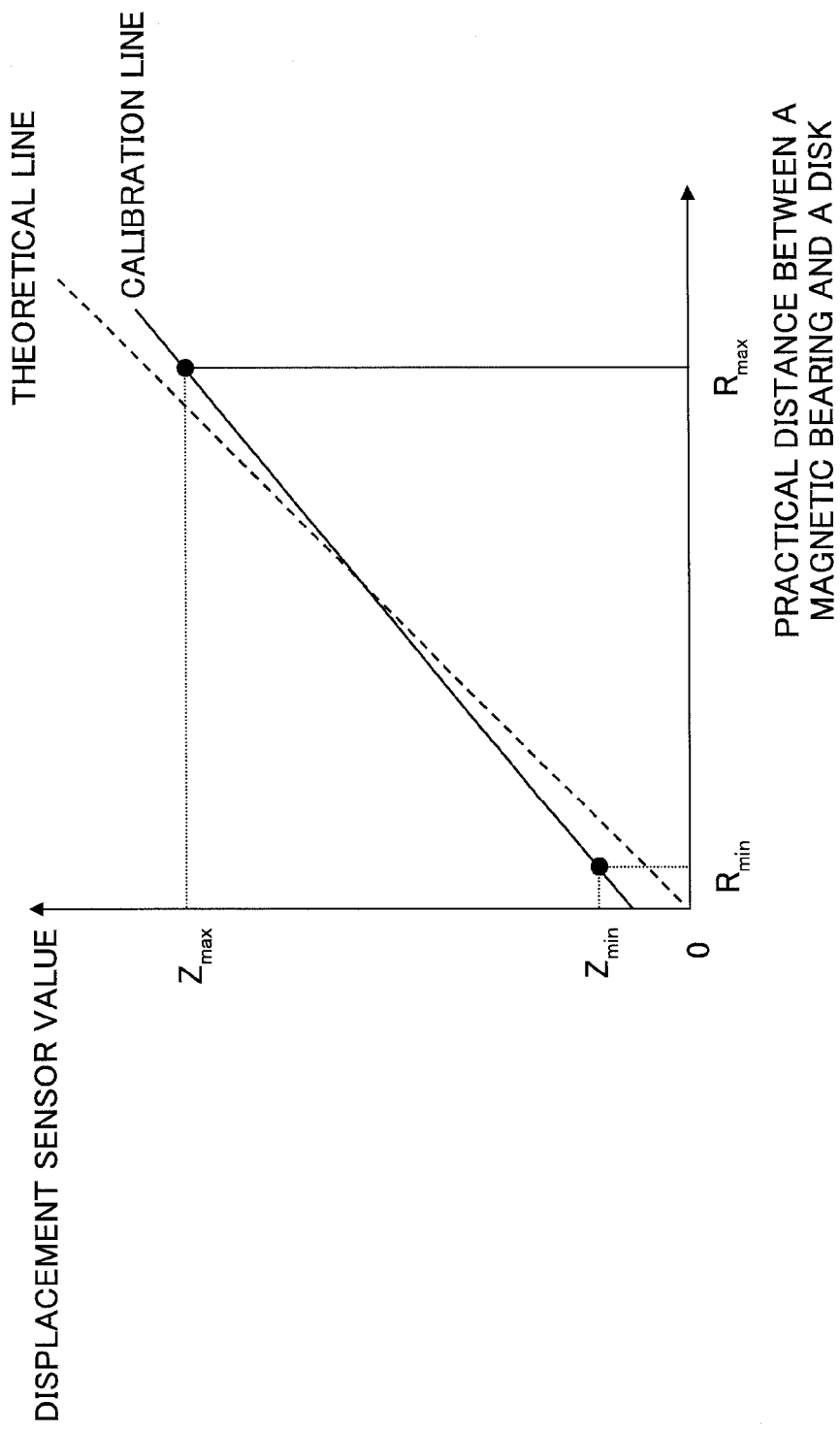
FIG. 32 is a diagram illustrating one example of a relationship between a distance between a disk and a displacement sensor and a sensor value.

FIG. 32 is a diagram illustrating one example of a relationship between an actual distance between a magnetic bearing 102 and a disk 91 and sensor values of the displacement sensors 127 and 128. Dimensions of the magnetic bearing 102 including $Z_{min}$ and $Z_{max}$ are known, and hence, a calibration line for each of the displacement sensors 127 and 128 can be obtained. The center positions of the displacement sensors 127 and 128 may be corrected to be an origin of coordinate based on each obtained calibration line.

Figure 33:
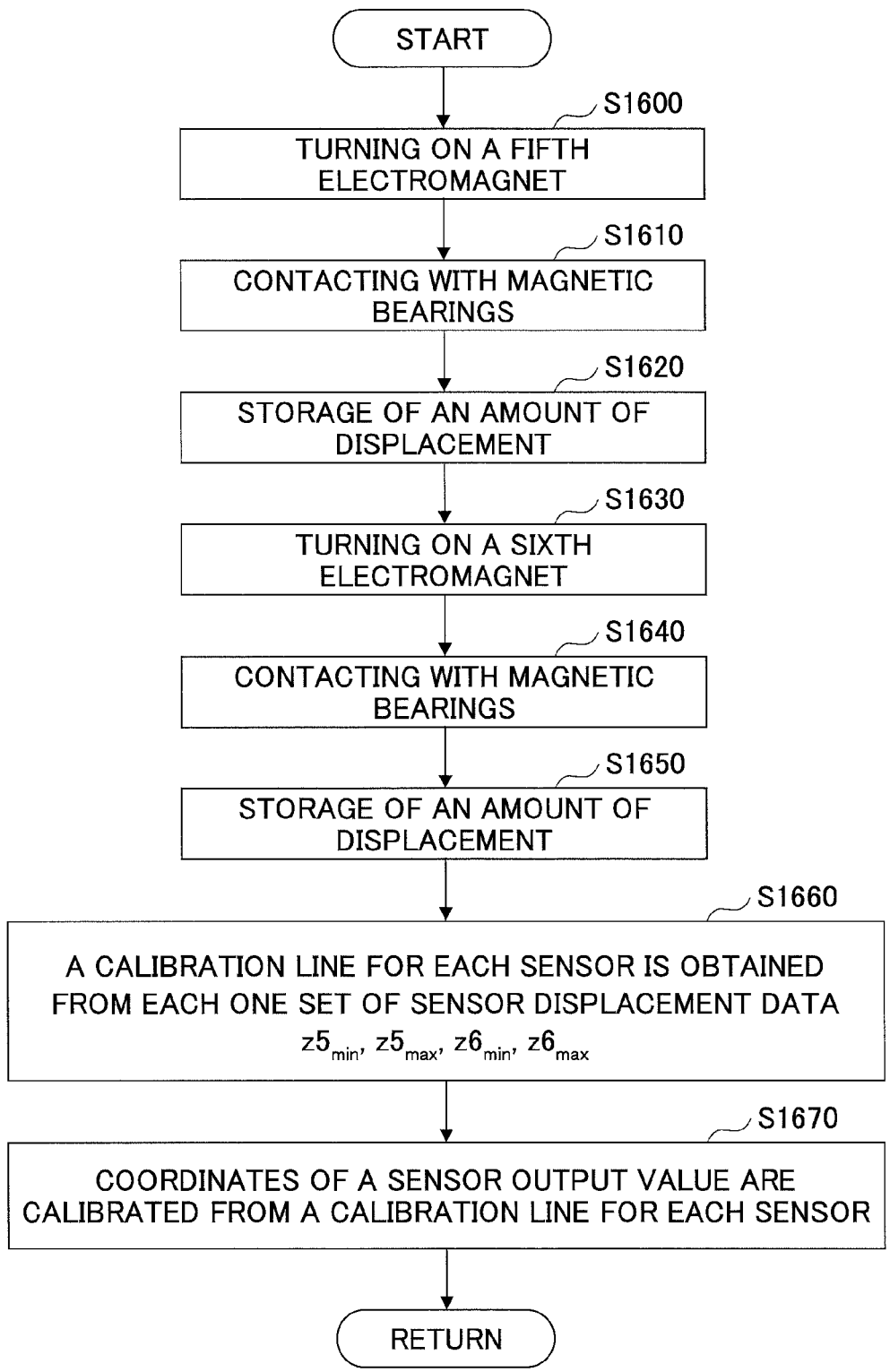
FIG. 33 is a processing flow diagram illustrating one example of a method for calibrating displacement sensors in an axial direction thereof.

FIG. 33 is a processing flow diagram illustrating one example of a method for calibrating a displacement sensor in an axial direction.

At step S1600, the fifth electromagnet 115 may be turned on and the sixth electromagnet 116 may be turned off.

At step S1610, the disk 91 is closest to, and may eventually contact, the magnetic bearing 102 at a side of the fifth electromagnet 115. In this case, $R_{min}=0$ may be satisfied.

At step S1620, amounts of displacement measured by the fifth displacement sensor 127 and the sixth displacement sensor 128 are stored.

At step S1630, the sixth electromagnet 116 may be turned on and the fifth electromagnet 115 may be turned off. The disk 91 moves to a side of the sixth electromagnet 116.

At step S1640, the disk 91 is closest to, and may eventually contact, the magnetic bearing 102 at a side of the sixth electromagnet 116.

At step S1650, amounts of displacement that are measured values of the fifth displacement sensor and the sixth displacement sensor are stored on the condition that the disk 91 contacts the magnetic bearing 102 at a side of the sixth electromagnet 116.

At step S1660, a calibration line for a sensor can be obtained from one set of displacement data $Z5_{min}$ and $z5_{max}$ or $z6_{min}$ and $z6_{max}$ of each of the displacement sensors 127 and 128.

At step S1670, coordinates of a sensor output value are calibrated based on a calibration line for each sensor to complete calibration.

Figure 34:
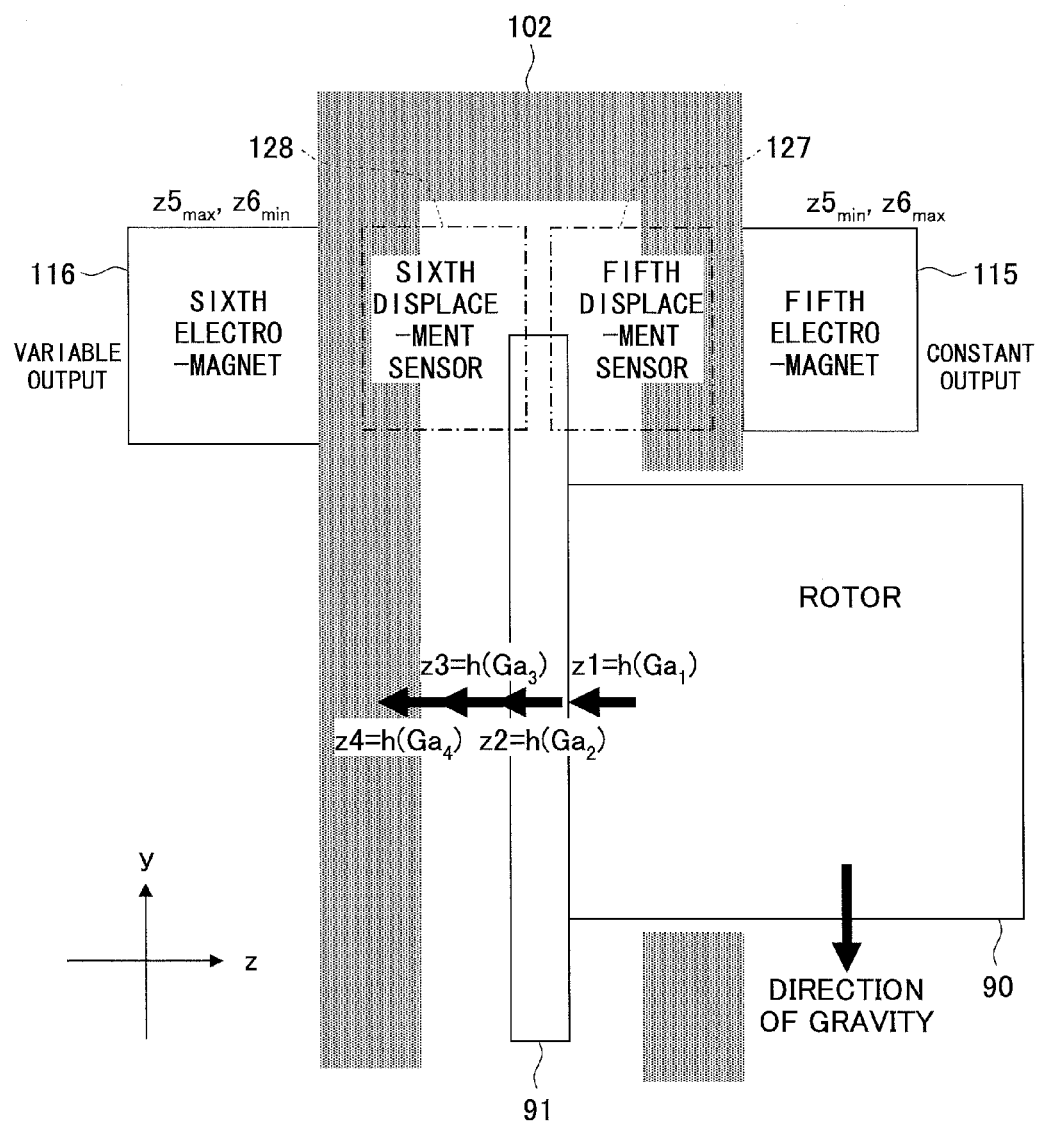
FIG. 34 is a diagram for explaining one example of calibration of an actuator in an axial direction thereof.

FIG. 34 is a diagram for explaining one example of calibration of an actuator in an axial direction.

FIG. 34 illustrates a cross-sectional configuration of the magnetic bearing 102 in the axial direction similarly to FIG. 31. First, setting values of the fifth and sixth electromagnets 115 and 116 are set in such a manner that the shaft 90 that is a rotor is positioned at a geometrical center of the magnetic bearing 102 in the axial direction as an initial position.

Then, while an electric current passing through the fifth electromagnet 115 is constant, the magnitude of electric current passing through the sixth electromagnet 116 is changed by a plurality of steps and an amount of displacement is measured by a displacement sensor. As illustrated in FIG. 34, for example, when $z=h(s)$ is a function representing an amount of displacement at an actuator output s, a level of an actuator output is changed by four steps $z1=h(Ga_1)$, $z2=h(Ga_2)$, $z3=h(Ga_3)$, and $z4=h(Ga_4)$ and amounts of displacement of the displacement sensors 115 and 116 are detected.

If this operation is also conducted for the fifth electromagnet 127, calibration of the electromagnets 115 and 116 can be conducted based on all the data of amounts of displacement.

Figure 35:
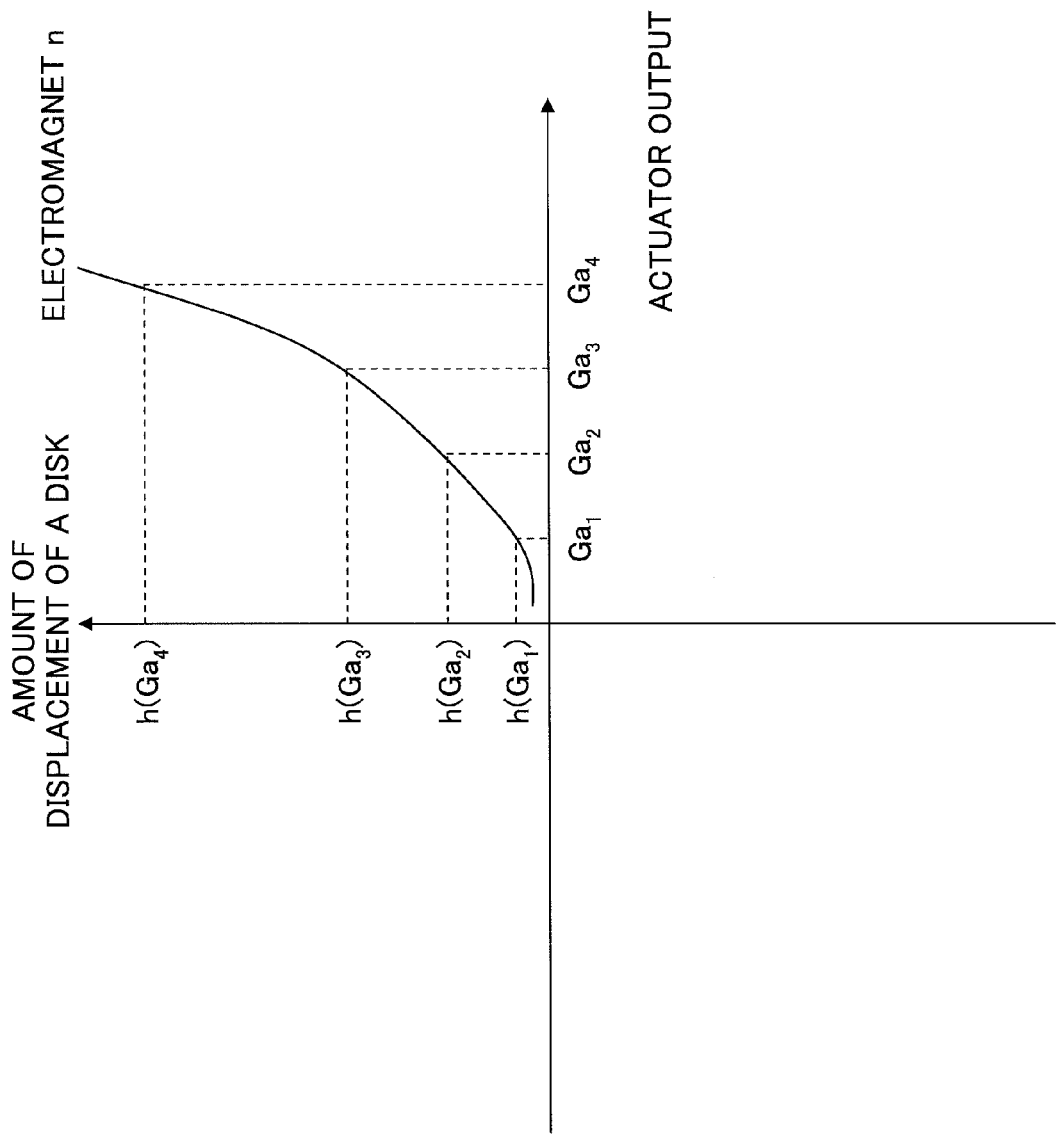
FIG. 35 is a diagram illustrating a relationship between an output of a magnetic bearing actuator and an amount of displacement of a rotor in an axial direction thereof.

FIG. 35 is a diagram illustrating a relationship between an actuator output of a magnetic bearing in an axial direction and an amount of displacement of a disk. A relationship between an actuator driving value and an actual amount of displacement of the disk can be obtained by acquiring data as illustrated in FIG. 35.

Figure 36:
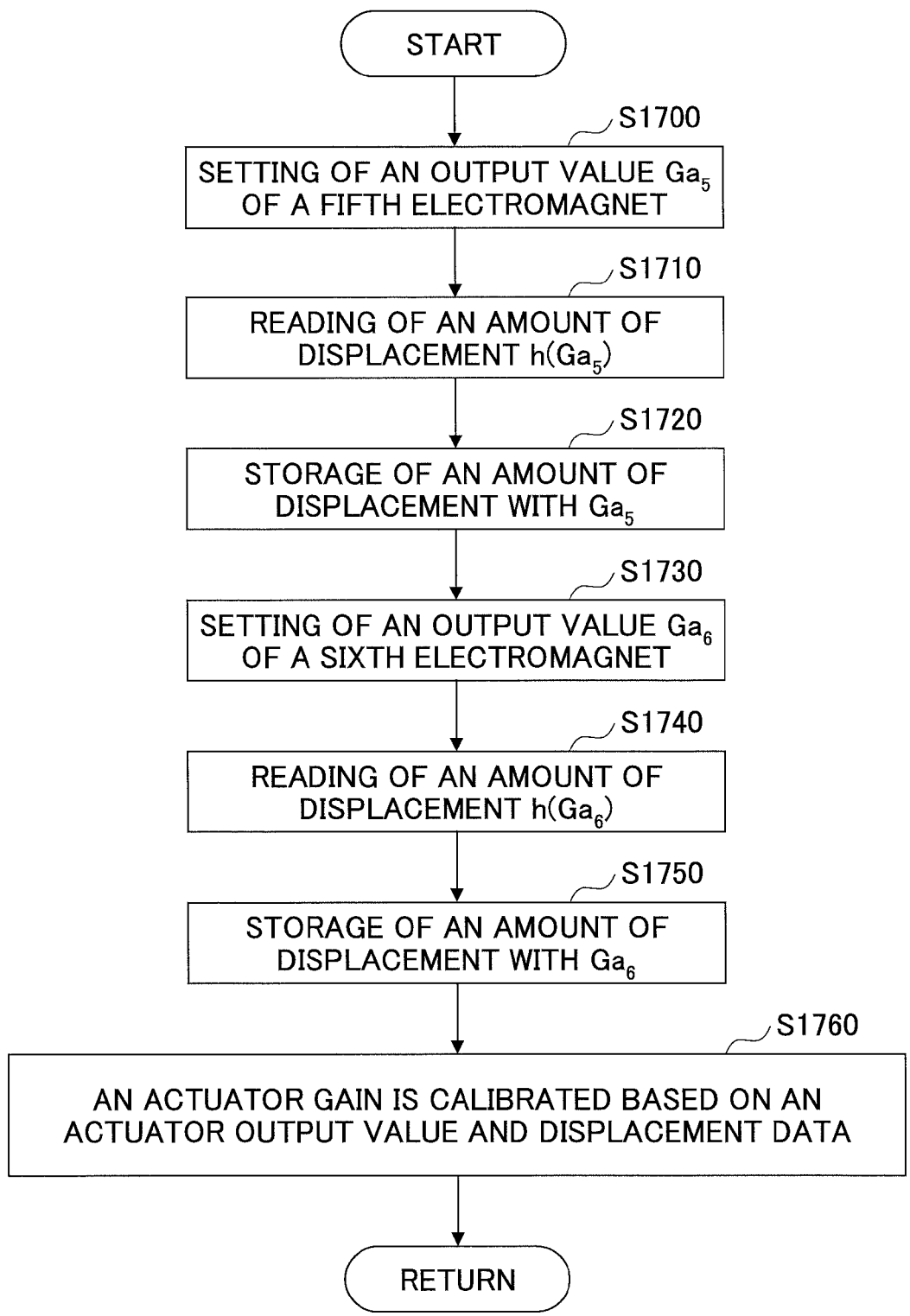
FIG. 36 is a diagram illustrating one example of a processing flow of a method for calibrating a magnetic bearing actuator in an axial direction thereof.

FIG. 36 is a diagram illustrating one example of a processing flow of a method for calibrating an actuator of a magnetic bearing in an axial direction.

At step S1700, the fifth and sixth electromagnets 115 and 116 are set in such a manner that the disk 91 that is an end portion of a shaft 90 is provided at a geometrical center of the magnetic bearing 102, and subsequently, an output value $Ga_5$ of the fifth electromagnet 115 is set while an output value of the sixth electromagnet 116 is constant.

At step S1710, reading of a displacement mount $z5=h(Ga_5)$ of the disk 91 is conducted.

At step S1720, the displacement amount is stored together with $Ga_5$.

At step S1730, the fifth and sixth electromagnets 115 and 116 are set in such a manner that the disk 91 that is an end portion of the shaft 90 is provided at the geometrical center of the magnetic bearing 102, and subsequently, an output value $Ga_6$ of the sixth electromagnet is set while an output value of the fifth electromagnet is constant.

At step S1740, reading of a displacement mount $z6=h(Ga_6)$ of the disk 91 is conducted.

At step S1750, the displacement amount is stored together with $Ga_6$.

At step S1760, actuator gains are calibrated based on output values of actuators (electromagnets 115 and 116) and displacement data.

Thus, according to the present embodiment, calibration of a sensor and an actuator can also be conducted in an axial direction.

The above-described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more".

What is claimed is:

1. A discharge-pumped gas laser device, comprising:
a laser chamber configured to generate laser light;
a pair of discharge electrodes provided in the laser chamber;
a fan with a magnetic bearing being provided in the laser chamber and configured to be capable of circulating a gas in the laser chamber;
a magnetic bearing controller connected to the magnetic bearing electrically, and being capable of controlling the magnetic bearing; and
a laser controller configured to control generation of the laser light,
wherein the fan includes a rotor and the magnetic bearing includes a magnetic floatation actuator configured to float the rotor and a displacement sensor configured to detect a position of the rotor,
wherein the laser controller causes the magnetic bearing controller to execute calibration of the displacement sensor and the magnetic floatation actuator and to calculate and set a control parameter necessary for a control of the magnetic bearing by using the calibrated displacement sensor and magnetic floatation actuator,
wherein the laser controller causes the magnetic bearing controller to execute calculation and setting of the control parameter in a case where at least one of installation of the laser chamber after replacement thereof, touchdown of the magnetic bearing, and an error in the magnetic bearing controller is detected, and
wherein the laser controller causes the magnetic bearing controller to execute calculation and setting of the control parameter in a case where at least one of a predetermined time course, a predetermined number of an output of the laser light, a predetermined change of a predetermined gas pressure in the laser chamber, vibration of the laser chamber, a predetermined change of a wavelength stability of the laser light, a predetermined change of an energy stability of the laser light, touchdown of the magnetic bearing, and an error in the magnetic bearing controller is detected after replacement of the laser chamber.

2. The discharge-pumped gas laser device as claimed in claim 1,
wherein the laser chamber is independently replaceable while the fan is separated from the magnetic bearing controller.

3. The discharge-pumped gas laser device as claimed in claim 1, wherein the control parameter includes a position of a geometrical center of the rotor and a position of a center-of-inertia of the fan.

* * * * *